US009692249B2

(12) United States Patent
Ito et al.

(10) Patent No.: US 9,692,249 B2
(45) Date of Patent: Jun. 27, 2017

(54) POWER SUPPLY SYSTEM, POWER TRANSMISSION DEVICE, POWER RECEIVING DEVICE, METHOD FOR CONTROLLING POWER TRANSMISSION DEVICE, METHOD FOR CONTROLLING POWER RECEIVING DEVICE, AND PROGRAM

(71) Applicant: CANON KABUSHIKI KAISHA, Tokyo (JP)

(72) Inventors: Takehiro Ito, Tokyo (JP); Makoto Kikugawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 14/165,962

(22) Filed: Jan. 28, 2014

(65) Prior Publication Data
US 2014/0210281 A1    Jul. 31, 2014

(30) Foreign Application Priority Data

Jan. 29, 2013    (JP) .................................. 2013-014350

(51) Int. Cl.
*H01F 27/42*    (2006.01)
*H01F 37/00*    (2006.01)
(Continued)

(52) U.S. Cl.
CPC ............ *H02J 7/025* (2013.01); *H02J 7/0047* (2013.01)

(58) Field of Classification Search
CPC ............ H02J 7/0047; H02J 17/00; H02J 7/02; H04W 52/04; H01F 38/14; H01F 27/42; G01R 33/44
(Continued)

(56) References Cited

U.S. PATENT DOCUMENTS

2009/0058679 A1*  3/2009  Lauterbach ............ G08G 1/093
                                                                340/905
2010/0244580 A1*  9/2010  Uchida .................... H02J 5/005
                                                                307/104
(Continued)

FOREIGN PATENT DOCUMENTS

CN    101950999 A    1/2011
EP       2216870 A2    8/2010
(Continued)

*Primary Examiner* — Rexford Barnie
*Assistant Examiner* — Jagdeep Dhillon
(74) *Attorney, Agent, or Firm* — Canon U.S.A., Inc. IP Division

(57) ABSTRACT

A power supply system wirelessly transmits power from a power transmission device to a power receiving device, in which the power transmission device includes a calculation unit configured to calculate a distance from the power transmission device to the power receiving device, a storage unit configured to store a preset relationship between a power transmission efficiency and a distance from the power transmission device to the power receiving device, and a wireless transmission unit configured to wirelessly transmit the distance calculated by the calculation unit and the relationship stored in the storage unit to the power receiving device, and the power receiving device includes a receiving unit configured to wirelessly receive the distance and the relationship from the power transmission device and a notification unit configured to notify a user of the distance and the relationship received by the receiving unit.

8 Claims, 21 Drawing Sheets

(51) Int. Cl.
*H01F 38/00* (2006.01)
*H02J 7/02* (2016.01)
*H02J 7/00* (2006.01)

(58) Field of Classification Search
USPC .... 307/104, 11, 9.1, 10.1, 149, 10.2, 66, 64, 307/80; 320/108, 109, 107; 455/66.1, 455/41.1, 41.2; 324/318; 700/296
See application file for complete search history.

(56) References Cited

U.S. PATENT DOCUMENTS

| | | | |
|---|---|---|---|
| 2011/0231029 A1* | 9/2011 | Ichikawa | B60L 11/123 700/298 |
| 2012/0200151 A1* | 8/2012 | Obayashi | B60L 11/123 307/9.1 |
| 2013/0010335 A1* | 1/2013 | Baba | G03G 15/5004 358/3.01 |
| 2013/0015720 A1* | 1/2013 | Shimokawa | H02J 5/005 307/104 |
| 2013/0076153 A1* | 3/2013 | Murayama | H02J 50/60 307/104 |
| 2013/0127409 A1* | 5/2013 | Ichikawa | H02J 7/0047 320/108 |

FOREIGN PATENT DOCUMENTS

| | | | | |
|---|---|---|---|---|
| JP | 2009-136132 A | 6/2009 | | |
| JP | 2009261156 A | 11/2009 | | |
| JP | EP 2216870 A2 * | 8/2010 | | H02J 5/005 |
| JP | 2012175764 A | 9/2012 | | |

\* cited by examiner

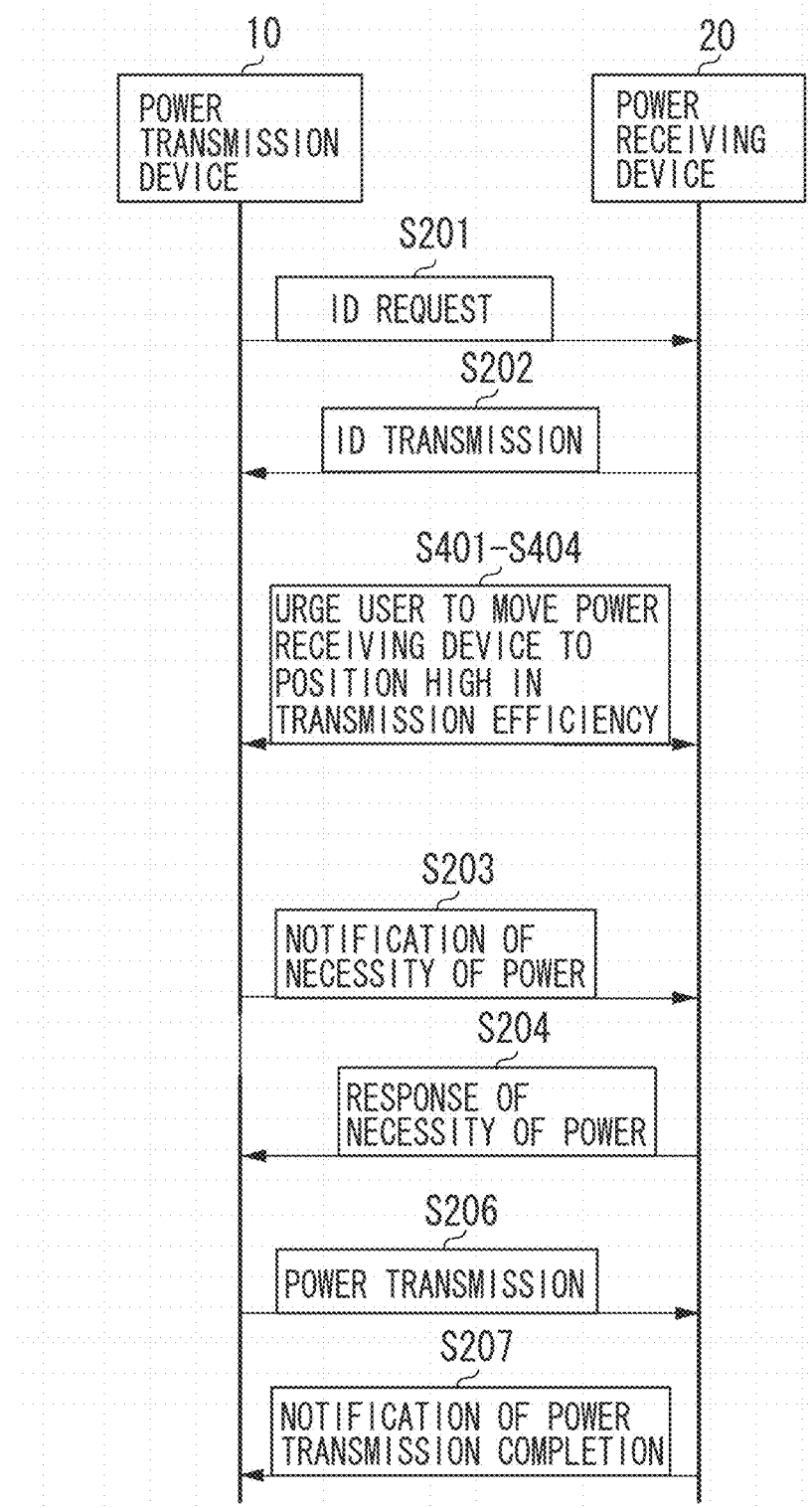

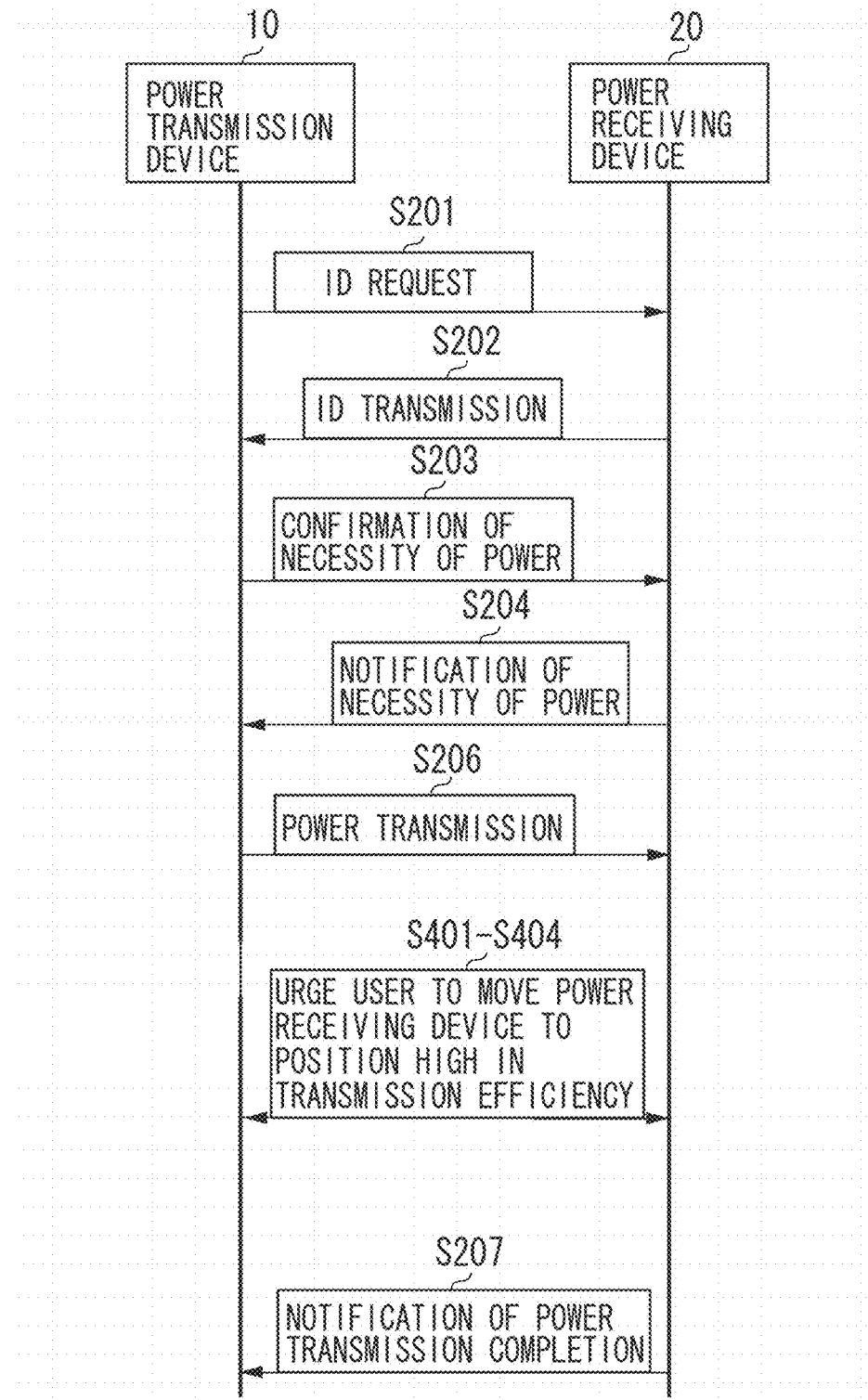

POWER SUPPLY SYSTEM, POWER TRANSMISSION DEVICE, POWER RECEIVING DEVICE, METHOD FOR CONTROLLING POWER TRANSMISSION DEVICE, METHOD FOR CONTROLLING POWER RECEIVING DEVICE, AND PROGRAM

BACKGROUND OF THE INVENTION

Field of the Invention

The present invention relates to a power supply system, a power transmission device, a power receiving device, a method for controlling the power transmission device, a method for controlling the power receiving device, and a program.

Description of the Related Art

There are four systems for supplying power in a non-contact manner (wirelessly): an electromagnetic induction system; a magnetic field resonance system; an electric field coupling system; and an electromagnetic wave reception system. In recent years, a magnetic field resonance system has drawn attention among the four systems in that it can transmit a sufficiently large amount of power with a long transmission distance. In the magnetic field resonance system, there has been proposed a "1 to N" (where N is a plural number) power supply system in which a power transmission device transmits power to a plurality of wireless power receiving devices, taking advantage of this long transmission distance (refer to Japanese Patent Application Laid-Open No. 2009-136132, for example).

In the configuration of Japanese Patent Application Laid-Open No. 2009-136132, the power transmission device transmits a certain pulse signal, while it is in a standby mode where the power transmission device does not supply power, to search for any wireless power receiving device approaching the power transmission device within several meters therefrom. If any wireless power receiving device transmits its unique ID to the power transmission device, the power transmission device determines whether the wireless power receiving device is a power supply target. If the wireless power receiving device is a power supply target, the power transmission device transmits power to the wireless power receiving device. At this point, the power transmission device can transmit a unique code to the wireless power receiving device to individually receive an amount of charge and a state of the device from the wireless power receiving device.

In the above configuration, the shorter the distance between the power transmission device and the power receiving device, the higher the transmission efficiency of power. However, it is difficult for the user of the power receiving device to know at which position the power receiving device can receive power at a good transmission efficiency.

SUMMARY OF THE INVENTION

According to an aspect of the present invention, a wireless power supply system includes a power transmission device and a power receiving device, the power transmission device wirelessly transmitting power to the power receiving device, wherein the power transmission device includes a calculation unit configured to calculate a distance from the power transmission device to the power receiving device, a storage unit configured to store a preset relationship between a power transmission efficiency and the distance, and a wireless transmission unit configured to wirelessly transmit the distance calculated by the calculation unit and the relationship stored in the storage unit to the power receiving device, and the power receiving device includes a receiving unit configured to wirelessly receive the distance and the relationship from the power transmission device, and a notification unit configured to notify a user of the power receiving device of the distance and the relationship received by the receiving unit.

Further features of the present invention will become apparent from the following description of exemplary embodiments with reference to the attached drawings.

BRIEF DESCRIPTION OF THE DRAWINGS

FIG. 20 is a sequence diagram of power transmission according to the third exemplary embodiment.

FIG. 21 is a sequence diagram of power transmission according to a fourth exemplary embodiment.

DESCRIPTION OF THE EMBODIMENTS

Figure 1:
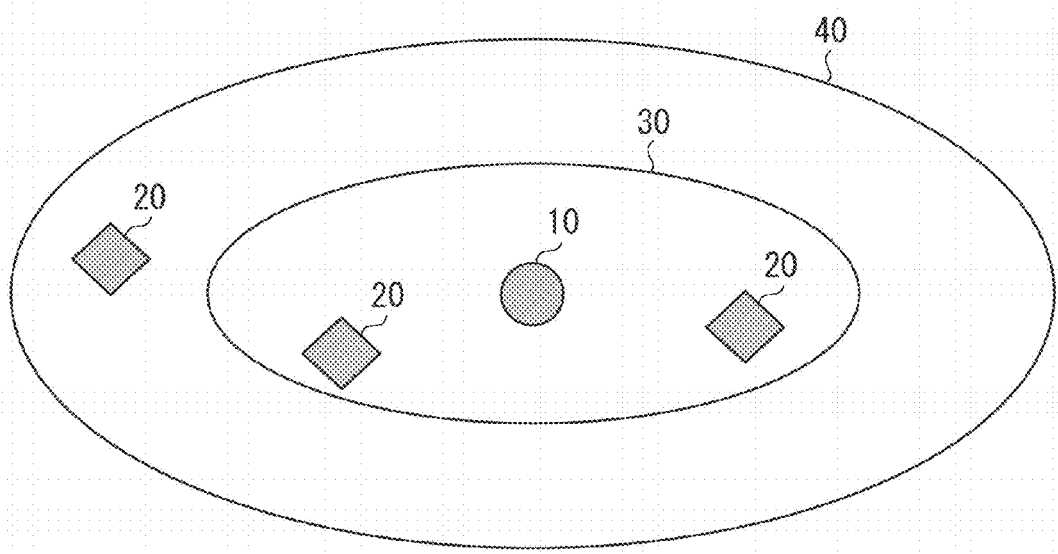
FIG. 1 is a schematic diagram illustrating a configuration of a wireless power supply system according to a first exemplary embodiment.

A first exemplary embodiment of the present invention is described below. FIG. 1 is a schematic diagram illustrating a configuration of a wireless power supply system according to the first exemplary embodiment of the present invention. As illustrated in FIG. 1, the wireless power supply system according to the exemplary embodiment of the present invention includes a power transmission device 10 capable of wirelessly supplying power to a plurality of power receiving devices 20. In the wireless power supply system according to the exemplary embodiment of the present invention, the power transmission device 10 supplies power to the power receiving device 20 using a magnetic field resonance system.

The power transmission device 10 according to the present exemplary embodiment is of the magnetic field resonance type. The power transmission device 10 wirelessly transmits power to the power receiving device 20. The power transmission device 10 communicates data required for power supplying with the power receiving device 20.

The power receiving device 20 is of the magnetic field resonance type. The power receiving device 20 wirelessly receives power from the power transmission device 10. The power receiving device 20 communicates data required for power supplying with the power transmission device 10.

A power supply area 30 is an area where power can be transmitted from the power transmission device 10 to the power receiving device 20. A communication area 40 is an area where data communication can be executed between the power transmission device 10 and the power receiving device 20.

As for the relationship between the power supply area 30 and the communication area 40, the communication area 40 is larger than the power supply area 30. The power supply area 30 is completely included in the communication area 40.

As illustrated in FIG. 1, if there is a plurality of the power receiving devices 20 in the power supply area 30, the power transmission device 10 can wirelessly supply power to the plurality of the power receiving devices 20 in parallel.

Figure 2:
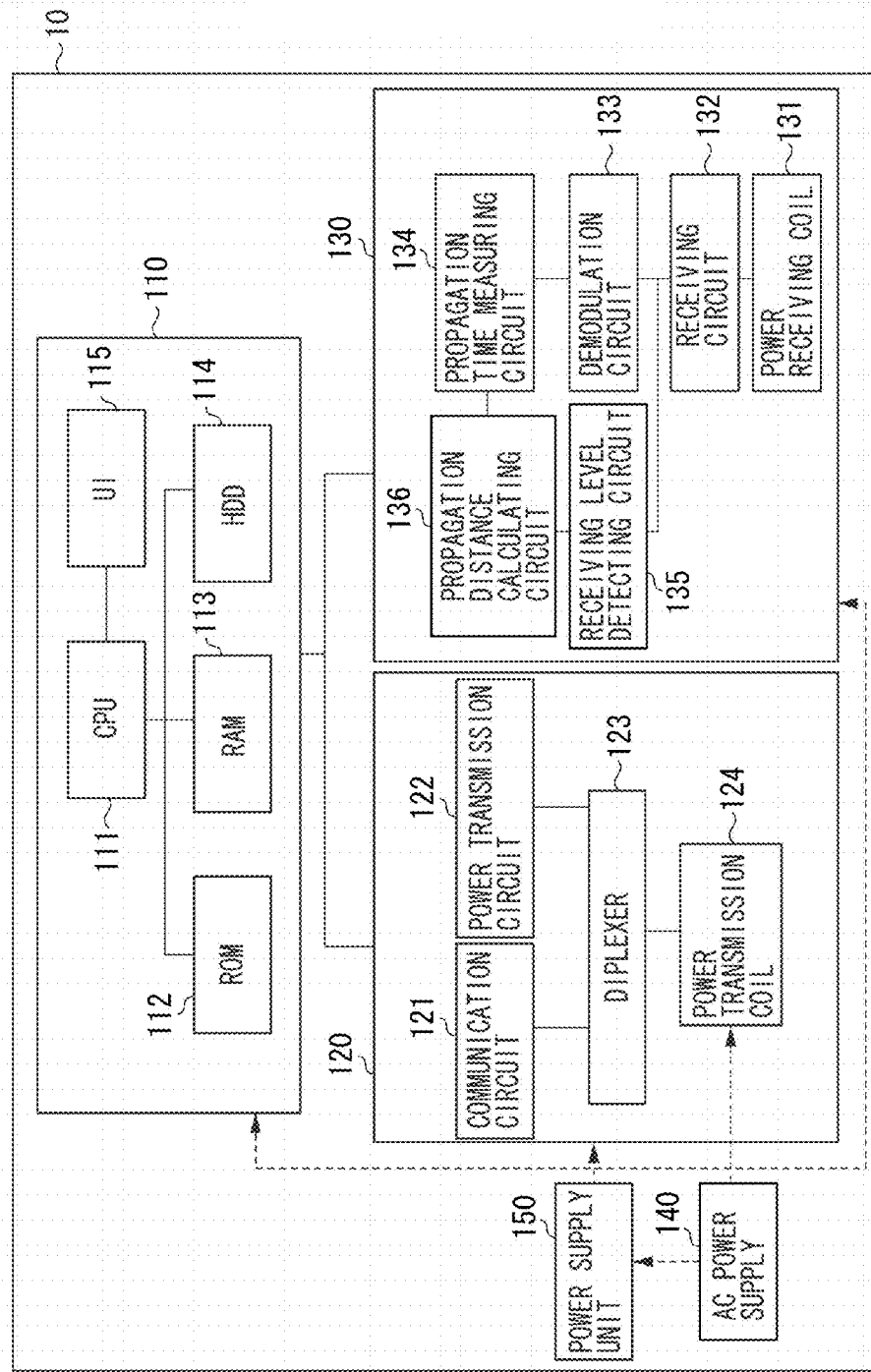
FIG. 2 is a functional block diagram illustrating a configuration of a power transmission device according to the first exemplary embodiment.

FIG. 2 is a functional block diagram illustrating a configuration of the power transmission device 10. In FIG. 2, solid lines indicate the transmission and the reception of data, and broken lines indicate the supply of power.

The power transmission device 10 includes a control unit 110, a wireless transmission unit 120, a wireless reception unit 130, an alternating current (AC) power supply 140, and a power supply unit 150.

The control unit 110 controls each unit of the power transmission device 10. The control unit 110 includes a central processing unit (CPU) 111, a read only memory (ROM) 112, a random access memory (RAM) 113, a hard disk drive (HDD) 114, and a user interface (UI) 115. The control unit 110 is connected with the wireless transmission unit 120 and the wireless reception unit 130 via an internal bus in such a manner that a signal can be transmitted and received.

The CPU 111 processes various data to control the power transmission device 10. The ROM 112 is a nonvolatile storage medium and stores a boot program executed by the CPU 111. The RAM 113 is a volatile storage medium and temporarily stores data and a program used by the CPU 111.

The HDD 114 is a nonvolatile storage medium and stores an operating system (OS) and an application program (a computer program) executed by the CPU 111. That is, the HDD 114 stores the computer program for executing the below-described control method according to the exemplary embodiment of the present invention in a computer-readable form.

The UI 115 displays various information for a user and receives various instructions from the user. The UI 115 includes a display device capable of displaying an image and an operation device for the user inputting instructions. For the display device, for example, a liquid crystal display panel capable of displaying characters and images is employed. For the operation device, various types of buttons and a touch panel integrated with the display device are employed.

The CPU 111 reads the computer program stored in the HDD 114, loads it into the RAM 113, and executes it. Thereby, the CPU 111 controls each unit of the power transmission device 10. Then, the processing described below (i.e., the control method according to the exemplary embodiment of the present invention) is realized.

The wireless transmission unit 120 wirelessly transmits power to the power receiving device 20. The wireless transmission unit 120 includes a communication circuit 121, a power transmission circuit 122, a diplexer 123, and a power transmission coil 124.

The communication circuit 121 generates a modulation signal for communication.

The power transmission circuit 122 generates a modulation signal for transmitting power.

The diplexer 123 synthesizes the modulation signals generated by the communication circuit 121 and by the power transmission circuit 122.

The power transmission coil 124 wirelessly transmits the modulation signals synthesized by the diplexer 123 to the power receiving device 20.

The wireless reception unit 130 wirelessly receives data from the power receiving device 20. The wireless reception unit 130 includes a power receiving coil 131, a receiving circuit 132, a demodulation circuit 133, a propagation time measuring circuit 134, a receiving level detecting circuit 135, and a propagation distance calculating circuit 136. The power receiving coil 131 wirelessly receives a modulation signal for communication from the power receiving device 20. The receiving circuit 132 receives the modulation signal wirelessly received by the power receiving coil 131.

The demodulation circuit 133 demodulates the modulation signal received by the receiving circuit 132.

The propagation time measuring circuit 134 measures a propagation time for a radio signal transmitted from the power receiving device 20 to reach the power transmission device 10 based on the signal demodulated by the demodulation circuit 133.

The receiving level detecting circuit 135 receives an analog signal from the receiving circuit 132 to detect a receiving level (a reception power level, for example) of the radio signal.

The propagation distance calculating circuit 136 calculates a distance between the power transmission device 10 and the power receiving device 20 based on the propagation time measured by the propagation time measuring circuit 134 and the receiving level detected by the receiving level detecting circuit 135.

The AC power supply 140 supplies AC voltage to the power transmission coil 124 and the power supply unit 150.

The power supply unit 150 converts the AC voltage supplied by the AC power supply 140 into direct current (DC) voltage and supplies the DC voltage to the control unit 110, the wireless transmission unit 120, and the wireless reception unit 130.

Figure 3:
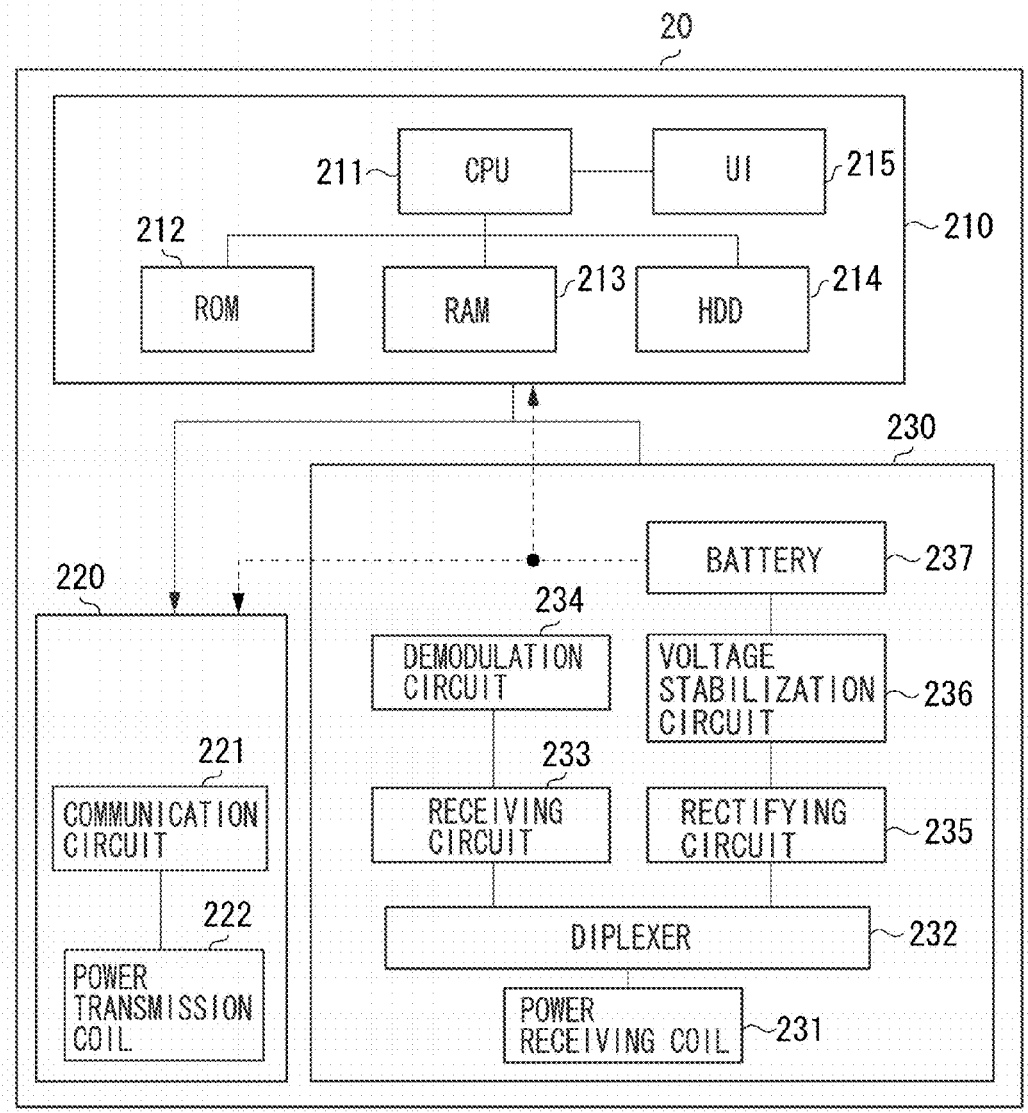
FIG. 3 is a functional block diagram illustrating a configuration of a power receiving device according to the first exemplary embodiment.

FIG. 3 is a functional block diagram illustrating a configuration of the power receiving device 20. In FIG. 3, solid lines indicate the transmission and the reception of data, and broken lines indicate the supply of power.

The power receiving device 20 includes a control unit 210, a wireless transmission unit 220, and a wireless reception unit 230.

The control unit 210 controls each unit of the power receiving device 20. The control unit 210 includes a CPU 211, a ROM 212, a RAM 213, a HDD 214, and a UI 215. The control unit 210 is connected with the wireless transmission unit 220 and the wireless reception unit 230 via an internal bus in such a manner that a signal can be transmitted and received.

The CPU 211 processes various data to control the power receiving device 20.

The ROM 212 is a nonvolatile storage medium and stores a boot program executed by the CPU 211.

The RAM 213 is a volatile storage medium and temporarily stores data and a program used by the CPU 211.

The HDD 214 is a nonvolatile storage medium and stores an OS and an application program (a computer program) executed by the CPU 211. That is, the HDD 214 stores the computer program for controlling the power receiving device 20.

The UI 215 displays various information for the user and receives various instructions from the user. The UI 215 includes a display device capable of displaying predetermined information and an operation device for receiving the operation of the user.

The CPU 211 reads the computer program for controlling the power receiving device 20, loads it into the RAM 213, and executes it. Thus, the CPU 211 controls each unit of the power receiving device 20. Then, the processing described below (i.e., the control method according to the exemplary embodiment of the present invention) is realized.

The wireless transmission unit 220 wirelessly transmits data to the power transmission device 10. The wireless transmission unit 220 includes a communication circuit 221 and a power transmission coil 222.

The communication circuit 221 generates a modulation signal for communication.

The power transmission coil 222 wirelessly transmits the modulation signals generated by the communication circuit 221 to the power transmission device 10.

The wireless reception unit 230 wirelessly receives power from the power transmission device 10. The wireless reception unit 230 includes a power receiving coil 231, a diplexer 232, a receiving circuit 233, a demodulation circuit 234, a rectifying circuit 235, a voltage stabilization circuit 236, and a battery 237.

The power receiving coil 231 receives a modulation signal from the power transmission device 10.

The diplexer 232 separates the modulation signal received by the power receiving coil 231 into a modulation signal for communication and a modulation signal for transmitting power.

The receiving circuit 233 receives the modulation signal for communication separated by the diplexer 232.

The demodulation circuit 234 demodulates the modulation signal received by the receiving circuit 233.

The rectifying circuit 235 rectifies the modulation signal for transmitting power separated by the diplexer 232 to generate DC voltage.

The voltage stabilization circuit 236 stabilizes the DC voltage generated by the rectifying circuit 235.

The battery 237 receives the voltage stabilized by the voltage stabilization circuit 236 and stores the power. The battery 237 supplies the DC voltage to the control unit 210, the wireless transmission unit 220, and the wireless reception unit 230 from the stored power.

Figure 4:
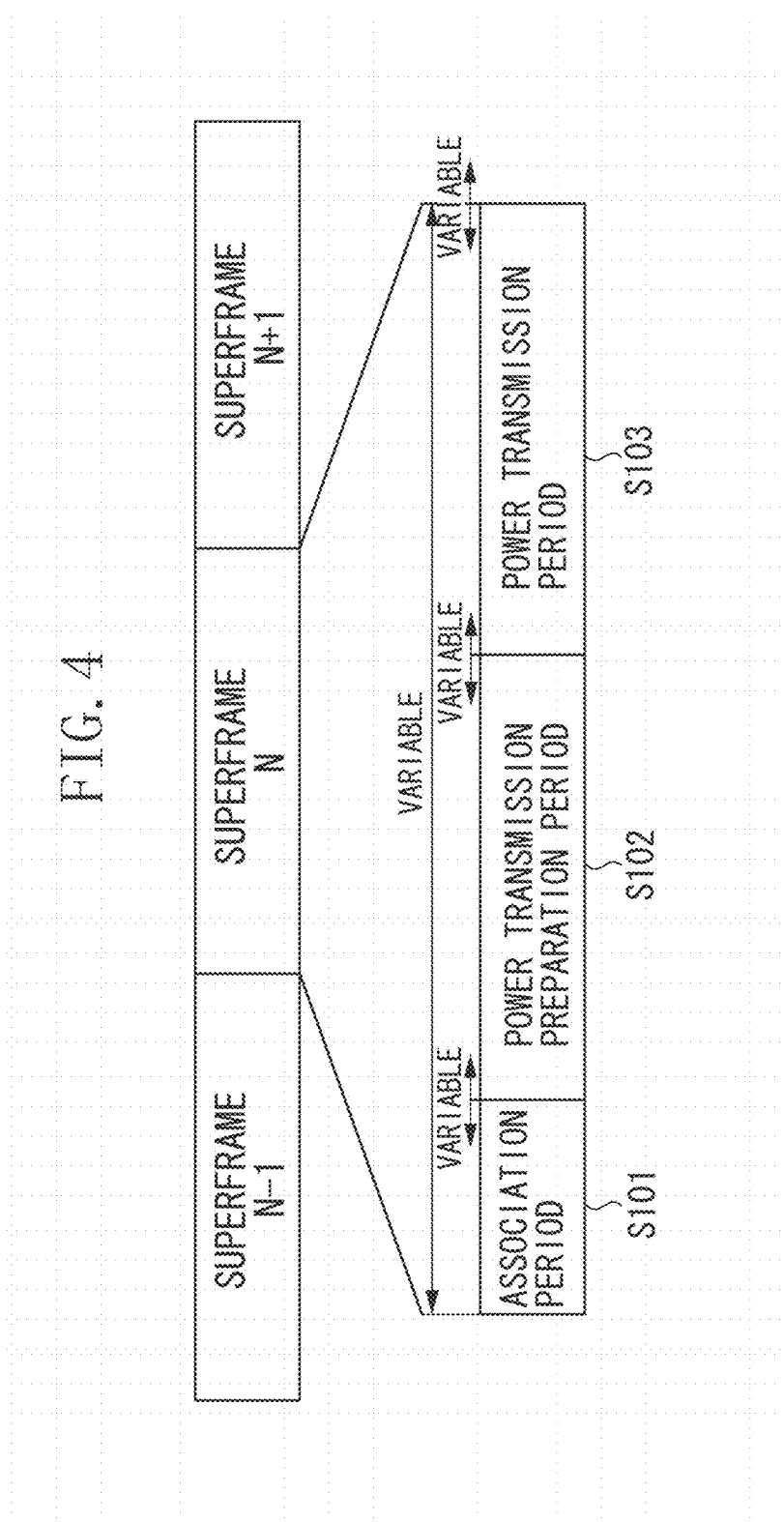
FIG. 4 is a diagram illustrating the structure of a superframe.

FIG. 4 is a diagram illustrating the structure of a superframe. In the wireless power supply system according to the first exemplary embodiment of the present invention, such a superframe is repetitively used to realize the wireless power supply.

Each superframe includes an association period (step S101), a power transmission preparation period (step S102), and a power transmission period (step S103). Each period is variable in length.

In step S101, the power transmission device 10 asks the power receiving device 20 for a device ID and the necessity of power. If the power receiving device 20 requires power, the processing shifts to step S102. The point in time when the processing shifts from steps S101 to S102 is also variable.

In step S102, the power receiving device 20 can transmit a response frame and acknowledgement frame in response to data request from the power transmission device 10. Each of response frames and acknowledgment frames is variable in length. When step S102 is completed, the processing shifts from step S102 to step S103. The period between steps S102 and S103 is also variable.

In step S103, the power transmission device 10 transmits power to the power receiving device 20. In step S103, even if the power receiving device 20 does not receive a request frame from the power transmission device 10, the power receiving device 20 can transmit the frame to the power transmission device 10.

Figure 5:
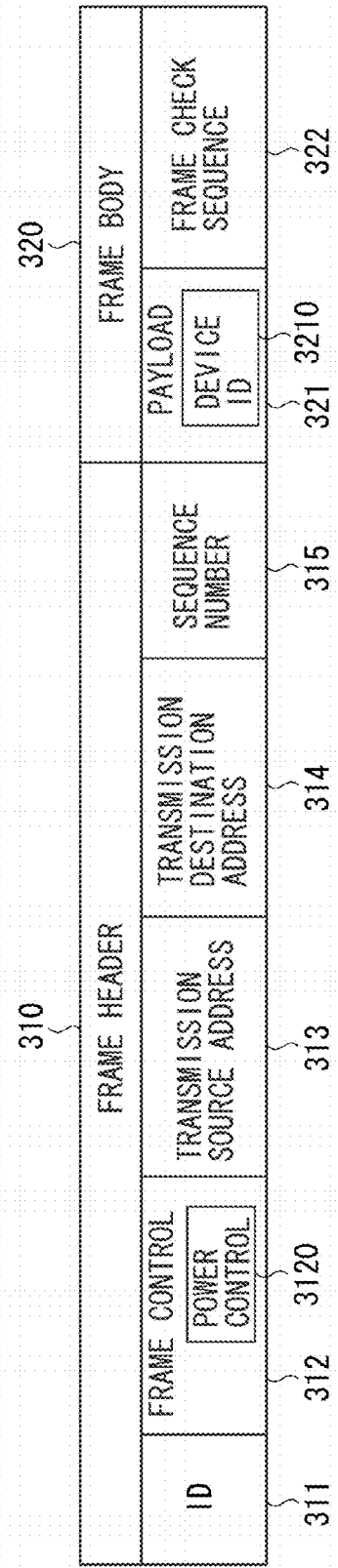
FIG. 5 is a chart illustrating a configuration of a frame format.

FIG. 5 is a chart illustrating a configuration of the frame format. In the superframe described above, data communication for wireless power supply is realized using a packet of the frame format illustrated in FIG. 5.

A frame header 310 indicates an address to which data is transferred and other information. The frame header 310 includes an identification (ID) 311, a frame control 312, a transmission source address 313, a transmission destination address 314, and a sequence number 315.

The ID 311 is an ID used when data communication is performed by the wireless power supply system.

The frame control 312 represents pieces of information for exchanging data of the power receiving device 20. The frame control 312 includes a power control 3120. The power control 3120 represents data for confirming the necessity of power.

The transmission source address 313 is an address of a transmission source from which data is transmitted.

The transmission destination address 314 is a destination address to which data is transferred.

The sequence number 315 is a frame number.

A frame body 320 represents pieces of information about a data main body to be transferred as data. The frame body 320 includes a payload 321 and a frame check sequence 322.

The payload 321 represents the data main body. For example, a device ID 3210 is allocated to the payload 321.

The frame check sequence 322 represents data for checking an error of the payload 321.

Figure 6:
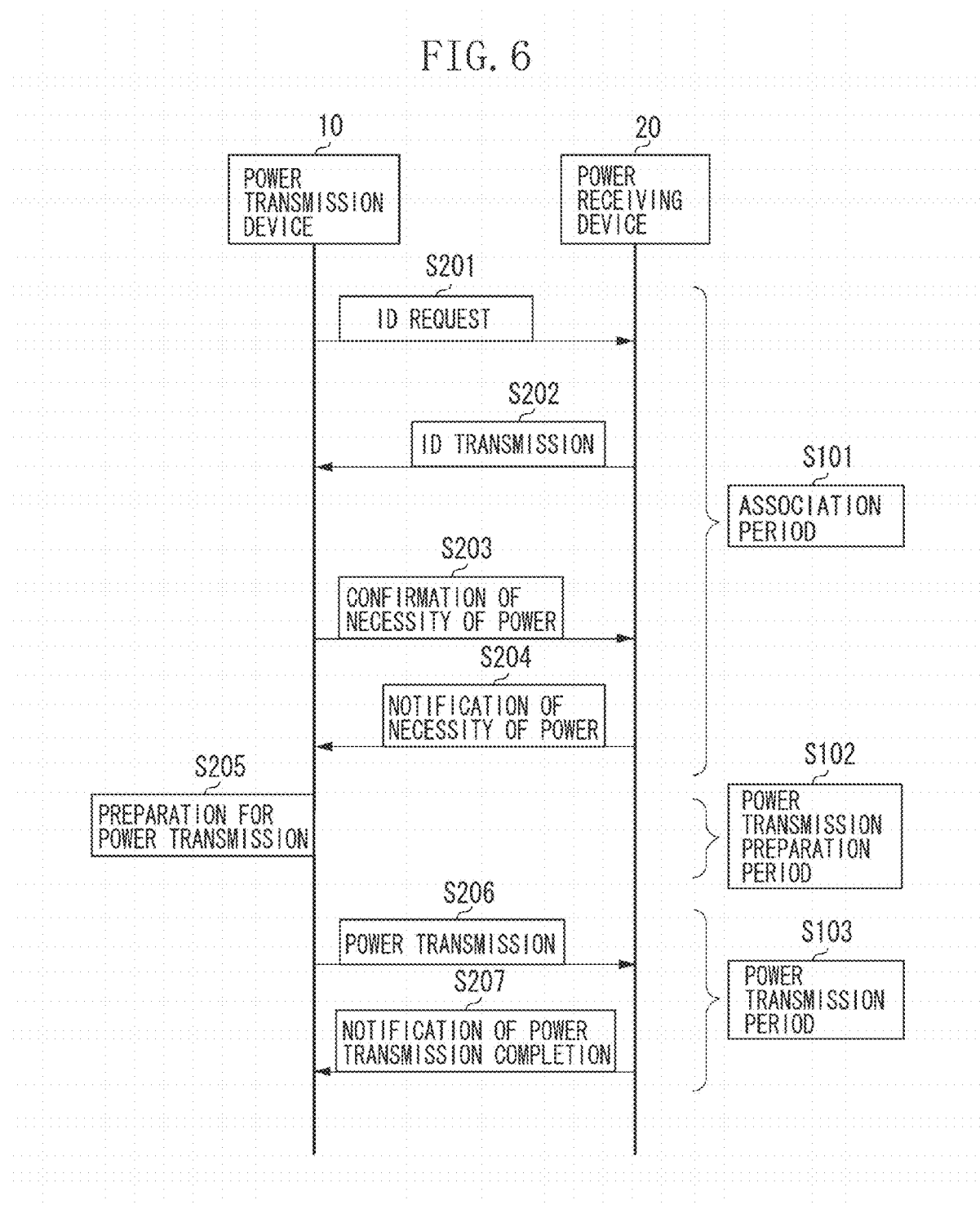
FIG. 6 is a sequence diagram indicating the transmission and reception of data performed between the power transmission device and the power receiving device in the superframe.

FIG. 6 is a sequence diagram indicating the transmission and reception of data performed between the power transmission device 10 and the power receiving device 20.

Signals and power are transmitted and received by the power transmission device 10 and the power receiving device 20 respectively using the above-described superframe, as illustrated in FIG. 6. This realizes data communication for wireless power supply.

In step S201, the power transmission device 10 transmits a device ID request to the power receiving device 20. At this point, the ID 311 of the frame format is used. The power receiving device 20 receives the device ID request from the power transmission device 10.

In step S202, the power receiving device 20 transmits the device ID to the power transmission device 10. The power transmission device 10 receives a device ID 3210 from the power receiving device 20. At this point, the ID 311 of the frame format is used.

In step S203, the power transmission device 10 confirms whether the power receiving device 20 requires power. At this point, the power control 3120 of the frame format is used. The power receiving device 20 receives the confirmation of necessity of power from the power transmission device 10. The power receiving device 20 determines necessity of power.

In step S204, the power receiving device 20 notifies the power transmission device 10 of necessity of power if the power receiving device 20 requires the power. Also, in step S204, the power receiving device 20 notifies the power transmission device 10 of unnecessity of power if the power receiving device 20 does not require the power. At this point, the power control 3120 of the frame format is used. The power transmission device 10 receives a response to the necessity of the power from the power receiving device 20. The power transmission device 10 determines whether the power receiving device 20 requires the power.

In step S205, if the power transmission device 10 receives a response that the power is required, the power transmission device 10 prepares for power transmission.

In step S206, the power transmission device 10 transmits the power to the power receiving device 20. The power receiving device 20 wirelessly receives the power from the power transmission device 10 and charges the battery 237 using the supplied power.

In step S207, when the battery 237 is fully charged, the power receiving device 20 notifies the power transmission device 10 of power transmission completion. At this point, the power control 3120 of the frame format is used.

Figure 7:
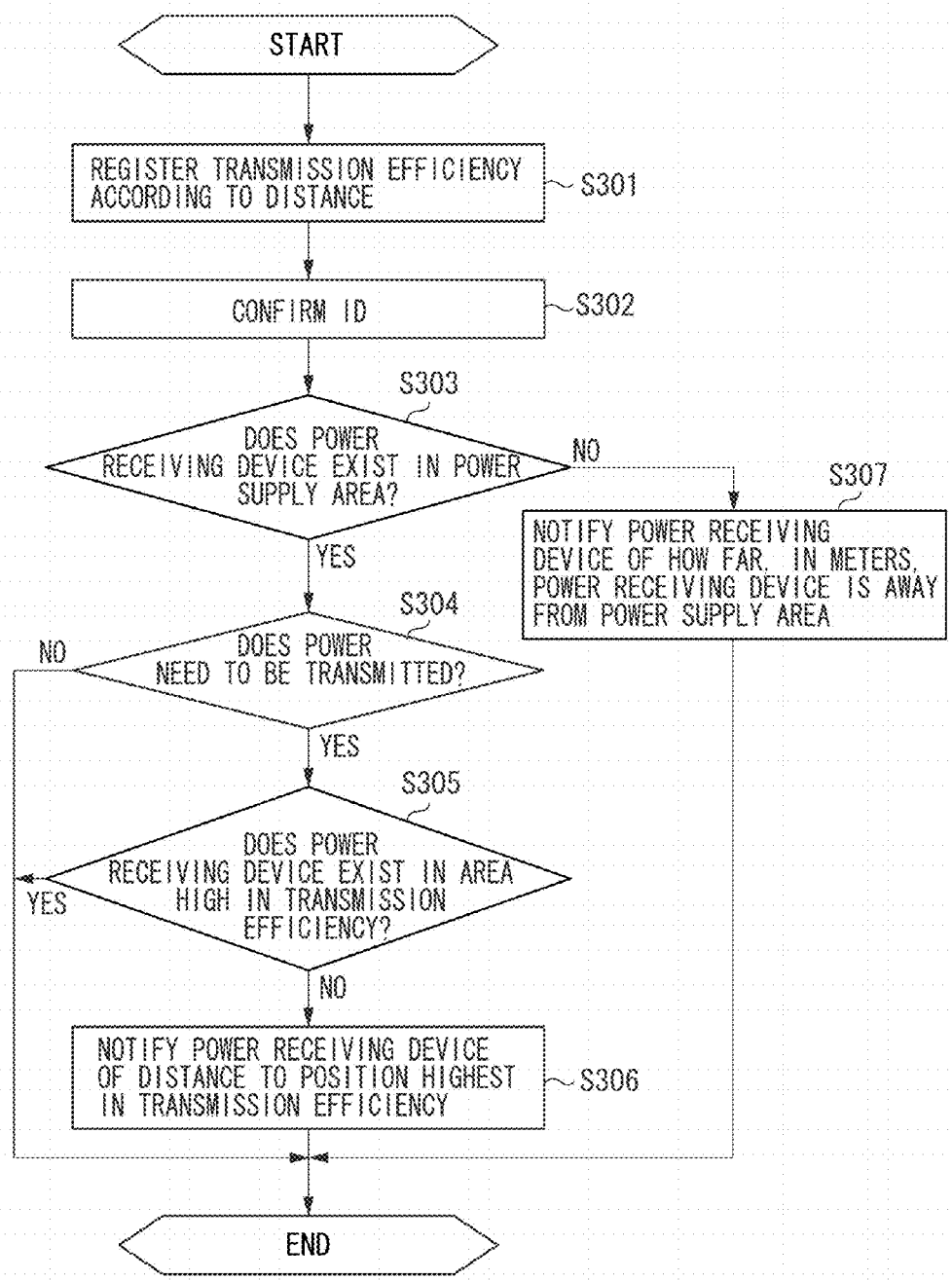
FIG. 7 is a flow chart illustrating a control method according to the first exemplary embodiment.

FIG. 7 is a flow chart illustrating a control method according to the first exemplary embodiment of the present invention. The computer program for executing the control method is prestored in the HDD 114 of the power transmission device 10 and the HDD 214 of the power receiving device 20. The CPU 111 of the power transmission device 10 and the CPU 211 of the power receiving device 20 read and execute their respective computer programs. This controls each unit of the power transmission device 10 and the power receiving device 20 to realize the control method.

In step S301, the power transmission device 10 registers a transmission efficiency according to a distance (relationship between a distance and a transmission efficiency) in the ROM 112 or the HDD 114 according to settings made by a shipper at a factory. The relationship between a distance and a transmission efficiency has been previously surveyed and known.

In step S302, the power transmission device 10 wirelessly polls the power receiving device 20 in the communication area 40 to confirm the device ID. The power receiving device 20 responds to the wireless communication of the power transmission device 10 to send the device ID via a wireless communication network.

In step S303, the power transmission device 10 confirms whether the power receiving device 20 exists in the power supply area 30. If the power receiving device 20 exists in the power supply area 30 (YES in step S303), the processing proceeds to step S304. If the power receiving device 20 does not exist in the power supply area 30 (NO in step S303), the processing proceeds to step S307.

In step S307, the power transmission device 10 notifies the power receiving device 20 how far the power receiving device 20 is away from the power supply area 30 in meters. The distance between the power transmission device 10 and the power receiving device 20 is measured by the propagation distance calculating circuit 136. This urges the user of the power receiving device 20 to move the power receiving device 20 to an area high in transmission efficiency.

In step S304, the power transmission device 10 confirms whether power needs to be transmitted to the power receiving device 20. If the power needs to be transmitted (YES in step S304), the power receiving device 20 sets a flag indicating the necessity of power transmission on the power control 3120 and responds to the power transmission device 10.

In step S305, the power transmission device 10 confirms whether the power receiving device 20 exists in an area high in transmission efficiency. The following method is used to determine whether an area is high in transmission efficiency, for example.

The propagation time measuring circuit 134 measures a propagation time for radio signal transmitted from the power receiving device 20 to reach the power transmission device 10 using the signal demodulated by the demodulation circuit 133. The receiving level detecting circuit 135 receives an analog reception signal to detect a receiving level of the received radio signal. The propagation distance calculating circuit 136 calculates the distance between the power transmission device 10 and the power receiving device 20 based on the propagation time measured by the propagation time measuring circuit 134 and the receiving level detected by the receiving level detecting circuit 135.

Figure 8:
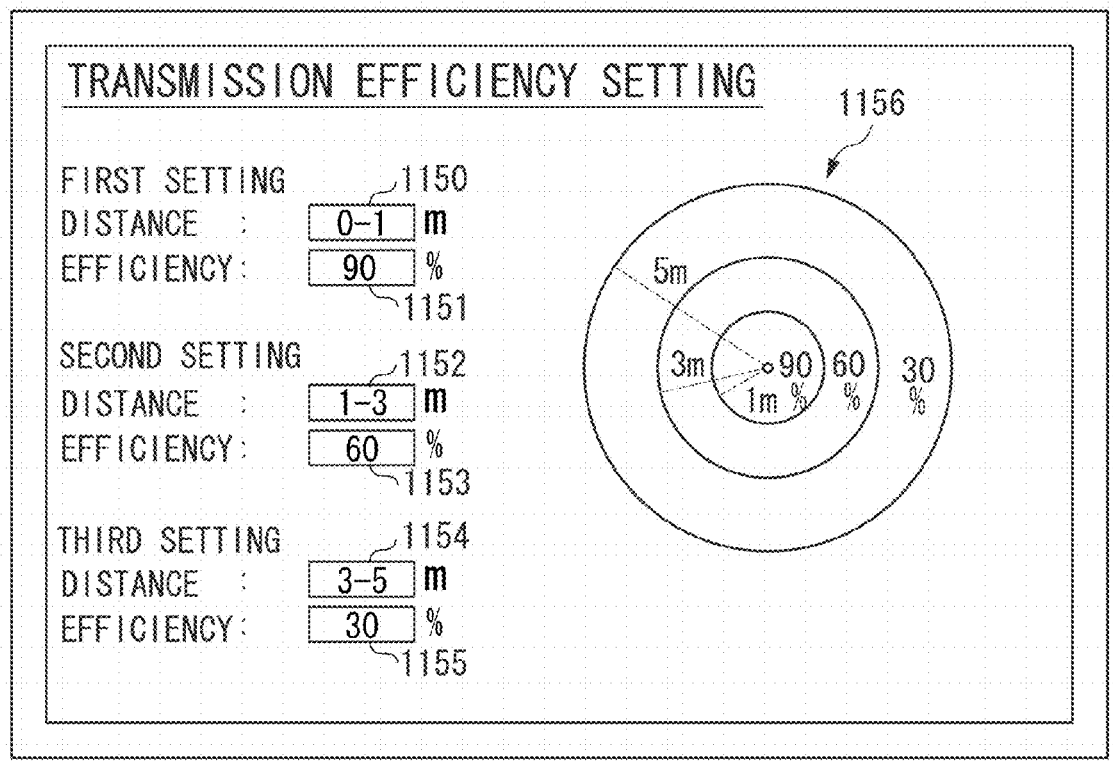
FIG. 8 illustrates an example of a screen for setting a transmission efficiency.

FIG. 8 illustrates an example of a screen displayed by the UI 215 when the transmission efficiency is set in step S301. As illustrated in FIG. 8, the display device of the UI 215 displays a transmission efficiency according to a distance. In this example, an area within a radius of one meter from the power transmission device 10 is set as an area where power can be transmitted at a transmission efficiency of 90%. An area within a radius of one to three meters from the power transmission device 10 is set as an area where power can be transmitted at a transmission efficiency of 60%. An area within a radius of three to five meters from the power transmission device 10 is set as an area where power can be transmitted at a transmission efficiency of 30%.

In this example, a distance of zero to one meter is input into a first distance display part 1150 and a transmission efficiency of 90% is input into a first efficiency display part 1151 as a first setting. A distance of one to three meters is input into a second distance display part 1152 and a transmission efficiency of 60% is input into a second efficiency display part 1153 as a second setting. A distance of three to five meters is input into a third distance display part 1154 and a transmission efficiency of 30% is input into a third efficiency display part 1155 as a third setting.

A simplified chart display part 1156 is an area where settings input into the first distance display part 1150 to the third efficiency display part 1155 are represented as simplified charts. As illustrated in FIG. 8, the simplified chart display part 1156 simply displays a transmission efficiency according to a distance using an image.

In this example, an area (area within a radius of one meter from the power transmission device 10) where power can be transmitted at a transmission efficiency of 90% is an area where power can be transmitted at the maximum transmission efficiency.

The CPU 111 collates the calculated distance with the transmission efficiency according to the distance registered in step S301 to determine whether the power receiving device 20 exists in an area high in transmission efficiency. If the power receiving device 20 exists within the area with a transmission efficiency of 90%, the CPU 111 determines that the power receiving device 20 exists in an area high in transmission efficiency (at a position with the maximum transmission efficiency) with reference to the example in FIG. 8. On the other hand, if the power receiving device 20 exists within the area with a transmission efficiency of 60% or 30%, the CPU 111 determines that the power receiving device 20 exists in an area not high in transmission efficiency.

In step S306, the power transmission device 10 notifies the power receiving device 20 of the distance to the area where the power transmission device 10 can transmit power at the maximum transmission efficiency.

Figure 9A:
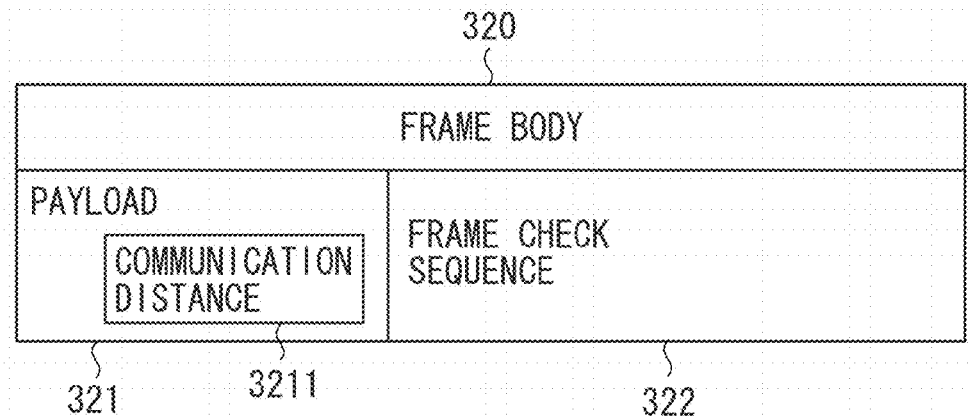
FIGS. 9A and 9B illustrate examples of payloads being frame body parts.
Figure 9B:
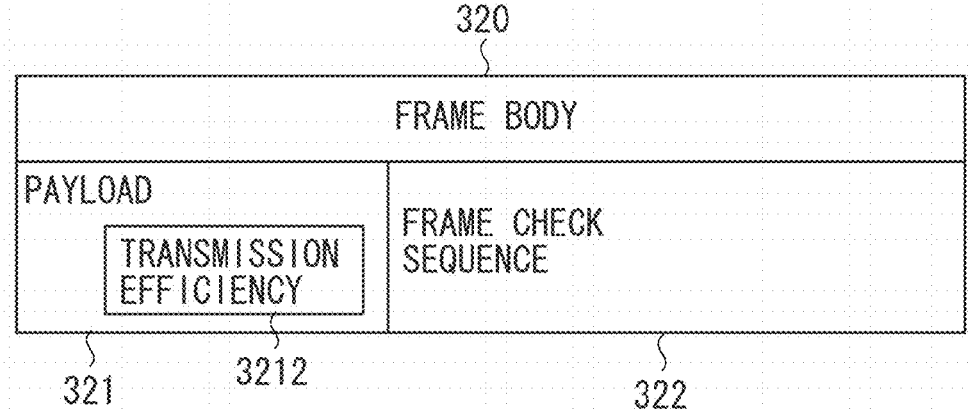

FIGS. 9A and 9B illustrate examples of the payload 321 being a part of the frame body 320. In step S303, the power transmission device 10 requests the power receiving device 20 to send the data of a communication distance 3211 thereto and receives that of the communication distance 3211. FIG. 9A illustrates a configuration of the payload 321 in this case. In this case, the communication distance 3211 is stored in the payload 321.

The power transmission device 10 transmits the data of a transmission efficiency 3212 to the power receiving device 20 based on the communication distance 3211 received from the power receiving device 20. FIG. 9B illustrates a configuration of the payload 321 in this case. In this case, the transmission efficiency 3212 is stored in the payload 321.

Figure 10:
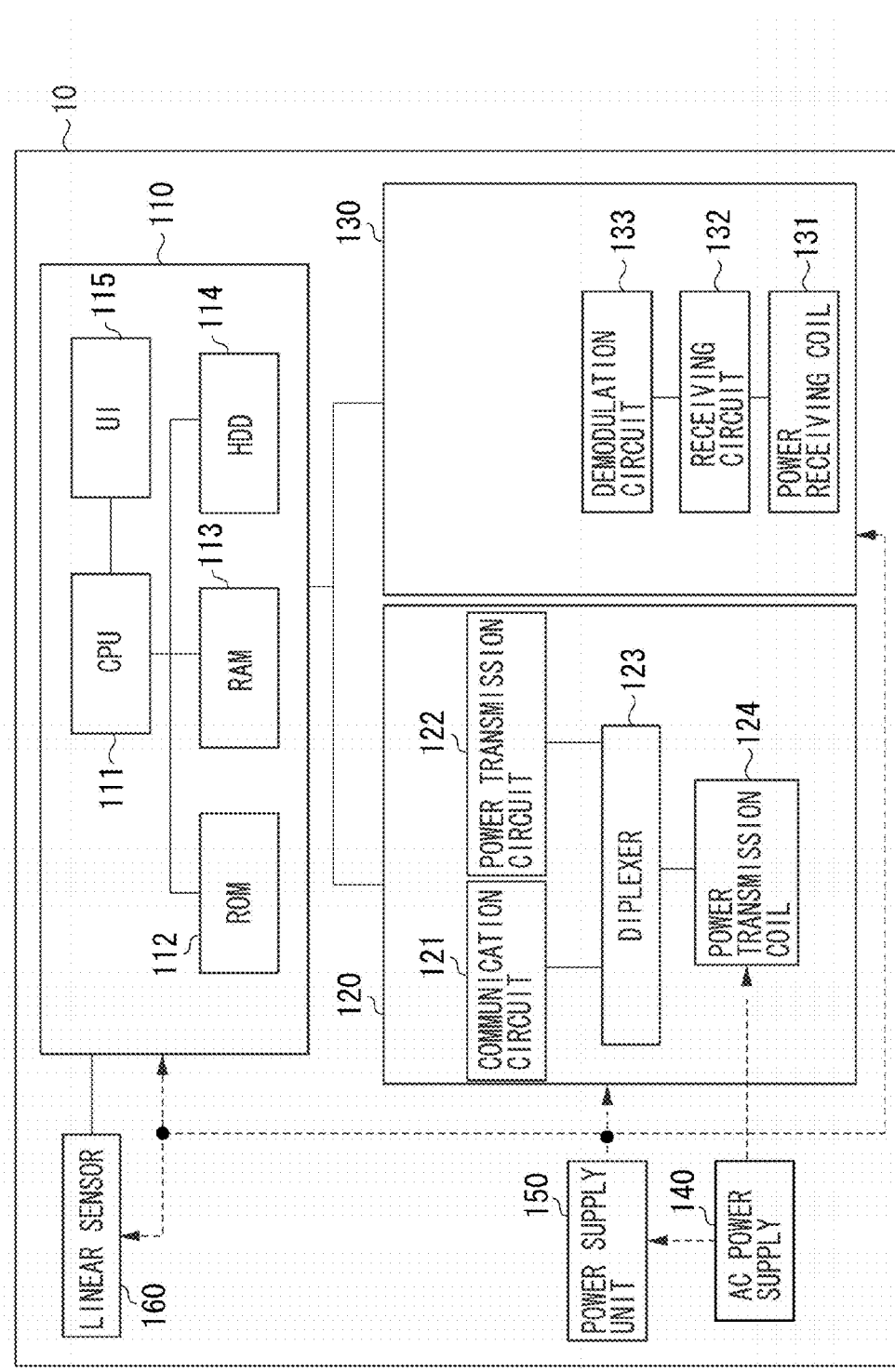
FIG. 10 is a block diagram illustrating a functional configuration of a power transmission device according to a second exemplary embodiment.

A second exemplary embodiment of the present invention is described below. FIG. 10 is a functional block of a power transmission device 10 according to the second exemplary embodiment of the present invention.

The second exemplary embodiment is different from the first exemplary embodiment in a configuration of a circuit for calculating a distance between the power transmission device 10 and the power receiving device 20. More specifically, in the first exemplary embodiment, the propagation time measuring circuit 134, the receiving level detecting circuit 135, and the propagation distance calculating circuit 136 in the power transmission device 10 calculate the distance between the power transmission device 10 and the power receiving device 20. On the other hand, the power transmission device 10 according to the second exemplary embodiment includes a linear sensor 160. The linear sensor 160 detects the user of the power receiving device 20 to calculate the distance between the power transmission device 10 and the power receiving device 20, determining whether the power receiving device 20 exists in an area high in transmission efficiency. Various types of known linear sensors can be applied to the linear sensor 160. As illustrated in FIG. 8, as long as the three settings are registered as the configuration, the linear sensor 160 detects three distances according to the settings.

The second exemplary embodiment does not require the propagation time measuring circuit 134, the receiving level detecting circuit 135, and the propagation distance calculating circuit 136. As for other configurations, a configuration common to that of the first exemplary embodiment can be applied to second exemplary embodiment. As for a control method, although a method for calculating the distance between the power transmission device 10 and the power receiving device 20 is different, a control method common to that of the first exemplary embodiment can be applied to second exemplary embodiment. Therefore, the description thereof is omitted.

A third exemplary embodiment of the present invention is described below. The configuration common to that of the first and second exemplary embodiments is given the same reference numerals and characters to omit the description thereof.

Figure 11:
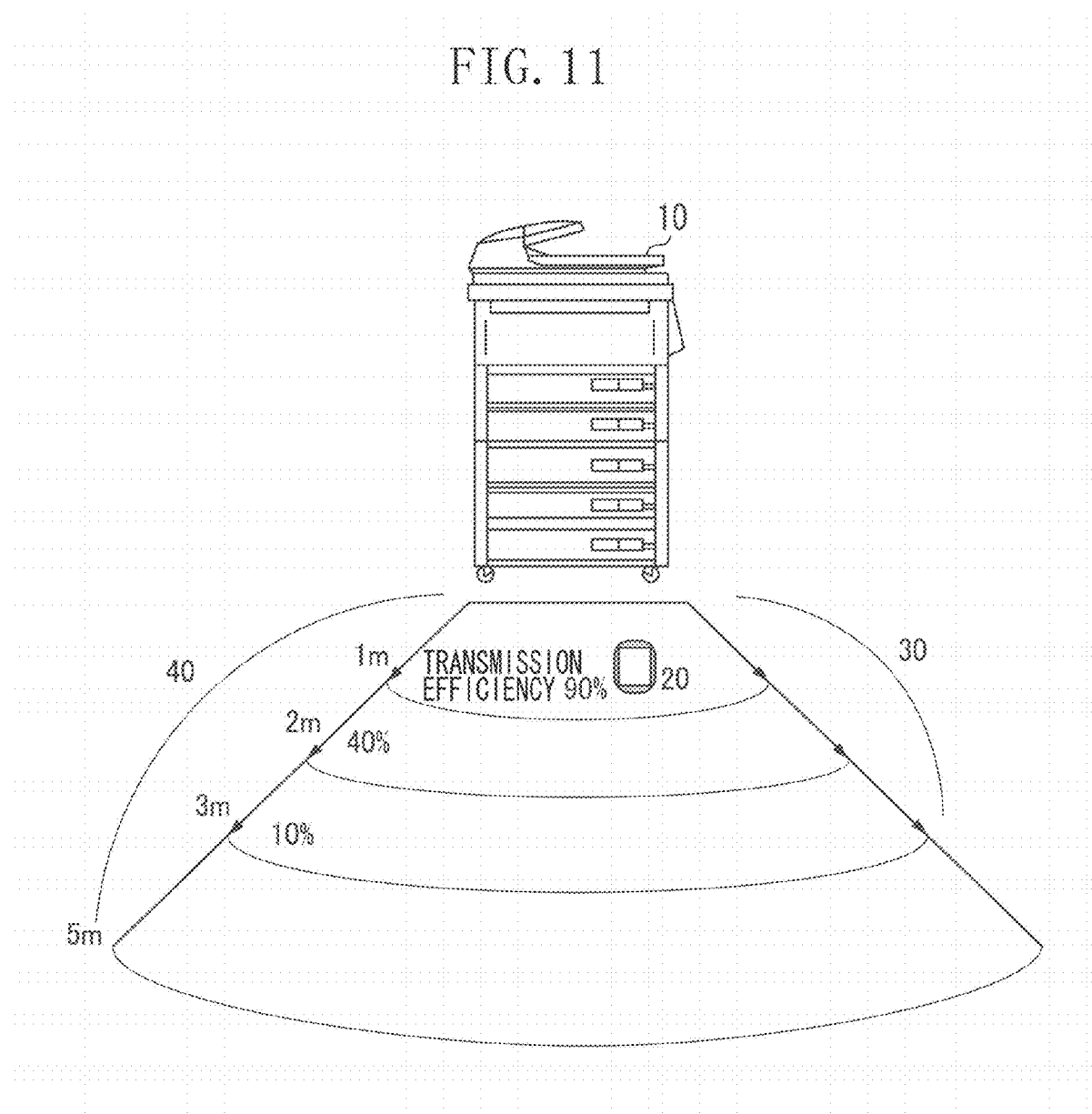
FIG. 11 is a schematic diagram illustrating a configuration of a wireless power supply system according to a third exemplary embodiment.

FIG. 11 is a schematic diagram illustrating a configuration of a wireless power supply system according to a third exemplary embodiment of the present invention. As is the case with the first exemplary embodiment, the wireless power supply system according to the third exemplary embodiment of the present invention includes a single power transmission device 10 capable of wirelessly supplying power to a plurality of the power receiving devices 20 using the magnetic field resonance system.

The power transmission device 10 wirelessly transmits power to the power receiving device 20. The power transmission device 10 communicates data required for power supplying with the power receiving device 20.

The power receiving device 20 wirelessly receives power from the power transmission device 10. The power receiving device 20 communicates data required for power supplying with the power transmission device 10.

The transmission efficiency according to the distance between the power transmission device 10 and the power receiving device 20 is previously confirmed and registered in the power transmission device 10.

As examples of registering the distance and the transmission efficiency, there are cited examples of a transmission efficiency of 90% in an area zero to one meter from the power transmission device 10, a transmission efficiency of 40% in an area one to two meters from the power transmission device 10, and a transmission efficiency of 10% in an area two to three meters from the power transmission device 10.

A power supply area 30 is an area where the power transmission device 10 can supply power to the power receiving device 20. In FIG. 11, an area zero to three meters from the power transmission device 10 is the power supply area 30.

A communication area 40 is an area where data communication can be performed between the power transmission device 10 and the power receiving device 20. In FIG. 11, an area zero to five meters from the power transmission device 10 is the communication area 40.

As for the relationship between the power supply area 30 and the communication area 40, the communication area 40 is larger than the power supply area 30 and the power supply area 30 is completely included in the communication area 40.

Figure 12:
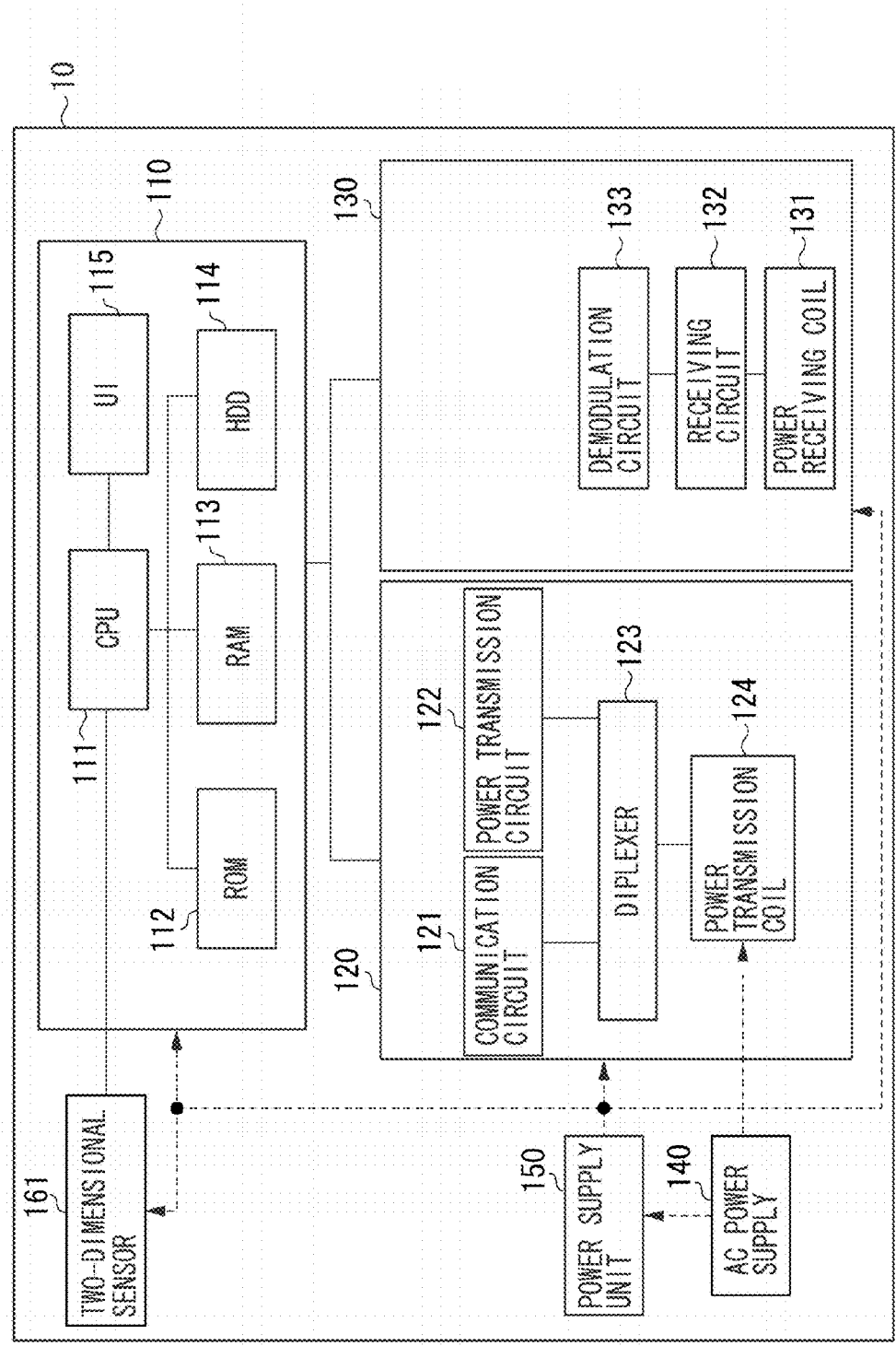
FIG. 12 is a block diagram illustrating a functional configuration of a power transmission device according to the third exemplary embodiment.

FIG. 12 is a functional block diagram illustrating a configuration of the power transmission device 10 according to the third exemplary embodiment. The power transmission device 10 is of the magnetic field resonance type. The power transmission device 10 includes the control unit 110, the wireless transmission unit 120, the wireless reception unit 130, the AC power supply 140, the power supply unit 150, and a two-dimensional sensor 161.

The power transmission device 10 according to the third exemplary embodiment is different from the power transmission device 10 according to the second exemplary embodiment in that the linear sensor 160 is replaced with the two-dimensional sensor 161. Other than this, a configuration common to that of the second exemplary embodiment is applied. Therefore, the description thereof is omitted.

The two-dimensional sensor 161 detects a position of a user (man) of the power receiving device 20 and a distance therefrom. The two-dimensional sensor 161 is connected with the CPU 111 by a serial interface (I/F) or the like. The control unit 110 detects the position of the user using sensor data output by the two-dimensional sensor 161. The control unit 110 wirelessly transmits the detected position of the user to the power receiving device 20 via the wireless transmission unit 120.

The power supply unit 150 converts the AC voltage supplied by the AC power supply 140 into DC voltage and supplies the DC voltage to the control unit 110, the wireless transmission unit 120, the wireless reception unit 130, and the two-dimensional sensor 161.

A configuration common to that of the power receiving device 20 according to the first exemplary embodiment is applied to the power receiving device 20 according to the third exemplary embodiment. Therefore, the description thereof is omitted.

The wireless power supply system according to the third exemplary embodiment of the present invention realizes wireless power supply such that the power transmission device 10 communicates with the power receiving device 20 using the superframe. The structure of the superframe and the frame format used in the third exemplary embodiment are common to those of the first exemplary embodiment (refer to FIGS. 4, 5, 9A, and 9B). Therefore, the description thereof is omitted.

A sequence for transmitting and receiving data between the power transmission device 10 and the power receiving device 20 using the superframe is also common to that of the first exemplary embodiment (refer to FIG. 6).

Figure 13:
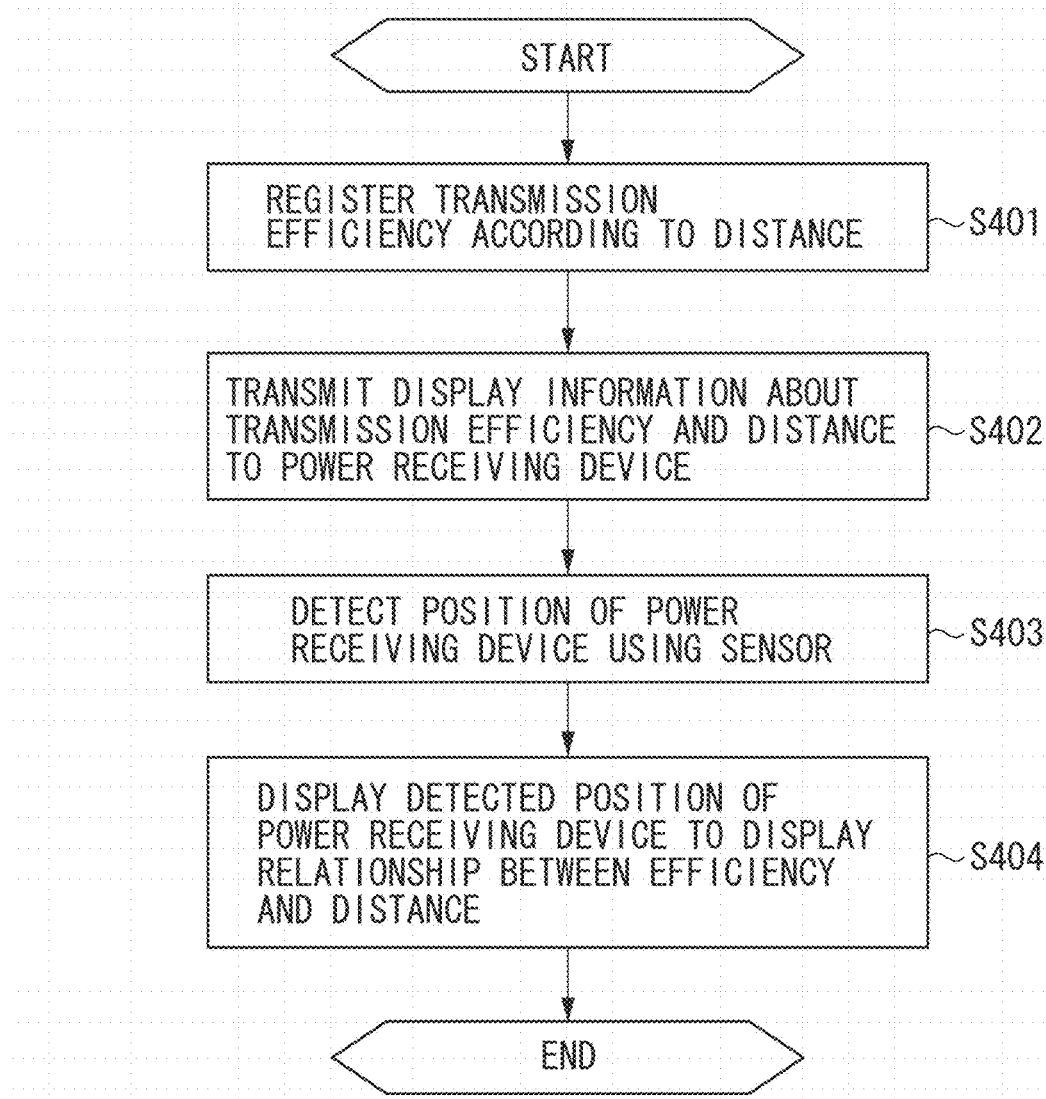
FIG. 13 is a flow chart illustrating a control method according to the third exemplary embodiment.

A control method according to the third exemplary embodiment of the present invention is described below with reference to FIG. 13. FIG. 13 is a flow chart illustrating the control method according to the third exemplary embodiment of the present invention. The computer programs for executing the control method are prestored in the HDD 114 of the power transmission device 10 and the HDD 214 of the power receiving device 20. The CPU 111 of the power transmission device 10 and the CPU 211 of the power receiving device 20 read and execute their respective computer programs to realize the control method. The execution of the control method urges the user of the power receiving device 20 to move to a position high in transmission efficiency.

In step S401, the power transmission device 10 stores the settings of the transmission efficiency according to a distance in the ROM 112 or the HDD 114 according to the operation on the UI 215 by a shipper at a factory.

Figure 14:
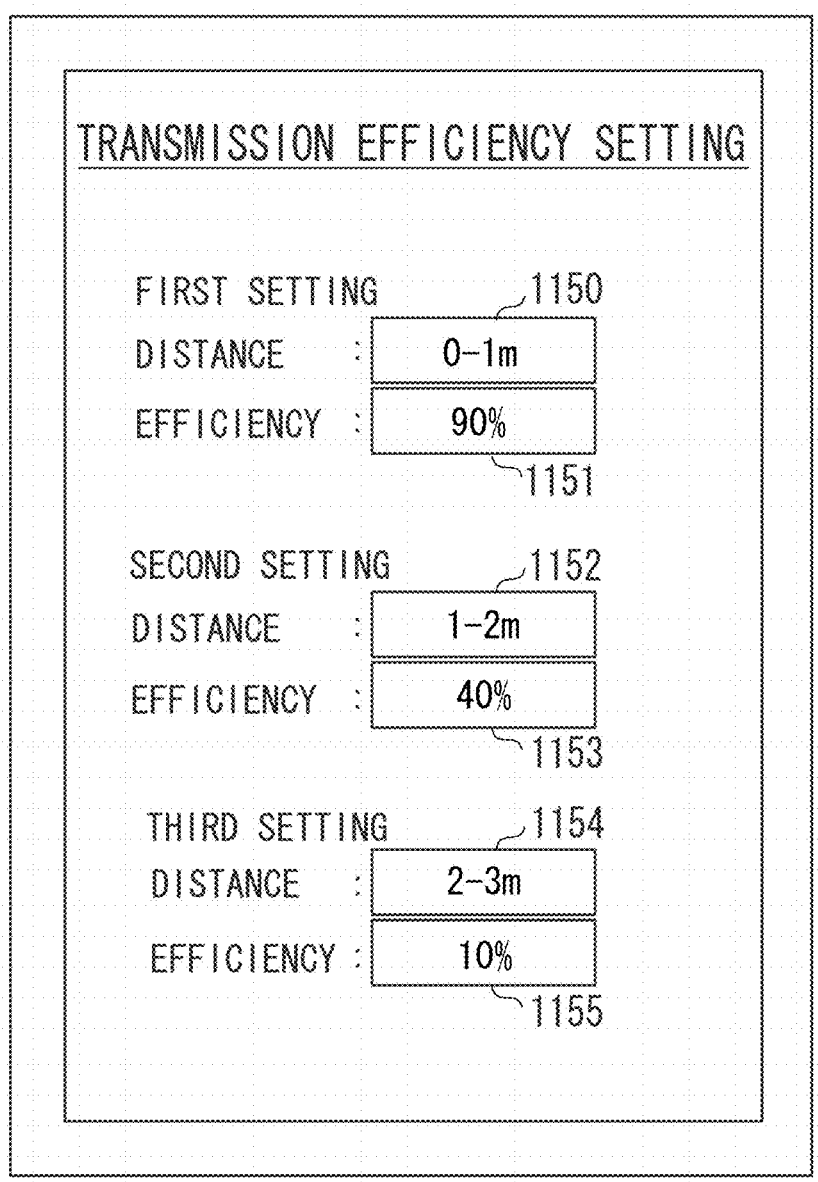
FIG. 14 illustrates an example of a screen for setting a transmission efficiency.

FIG. 14 illustrates an example of the screen displayed by the display device of the UI 215 when the transmission efficiency is set in step S401. In this example, the transmission efficiency is 90% in an area zero to one meter from the power transmission device 10. The transmission efficiency is 40% in an area one to two meters from the power transmission device 10. The transmission efficiency is 10% in an area two to three meters from the power transmission device 10.

In this example, a distance of zero to one meter is input into a first distance display part 1150 and a transmission efficiency of 90% is input into a first efficiency display part 1151 as a first setting. A distance of one to two meters is input into a second distance display part 1152 and a transmission efficiency of 40% is input into a second efficiency display part 1153 as a second setting. A distance of two to three meters is input into a third distance display part 1154 and a transmission efficiency of 10% is input into a third efficiency display part 1155 as a third setting.

In FIG. 14, the simplified chart display part 1156 (refer to FIG. 8) is not provided therein, however, the simplified chart display part 1156 may be provided.

Figure 15:
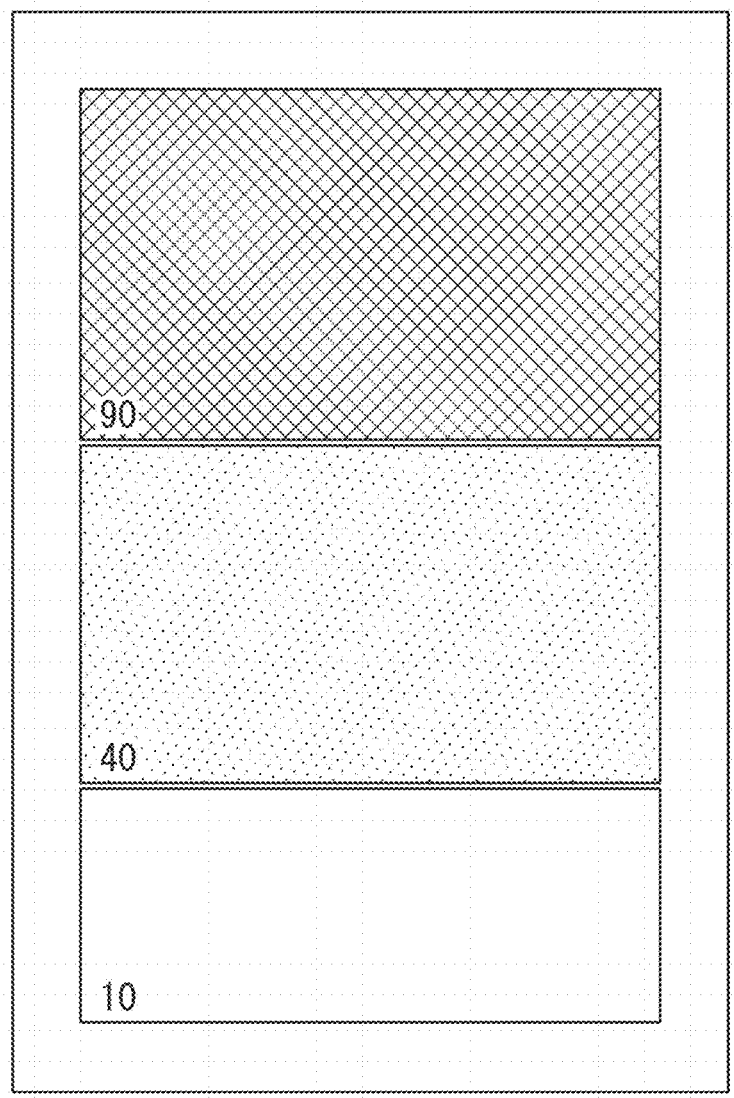
FIG. 15 illustrates an example of display of the relationship between the transmission efficiency and a distance.

In step S402, the power transmission device 10 wirelessly transmits the display information about the transmission efficiency and the distance to the power receiving device 20 in the communication area 40. The power receiving device 20 displays the received information on the display device of the UI 215. FIG. 15 illustrates an example of display of the relationship between the transmission efficiency and the distance. As illustrated in FIG. 15, the power receiving device 20 displays on the display device of the UI 215 the relationship between the transmission efficiency and the distance, which is set in step S401. The relationship indicates that the transmission efficiency is 90% in an area zero to one meter from the power transmission device 10, the transmission efficiency is 40% in an area one to two meters therefrom, and the transmission efficiency is 10% in an area two meters or more therefrom. The numerals in FIG. 15 indicate the transmission efficiencies. At this point, it is user friendly to display the areas in a different color for each power-reception efficiency.

In step S403, the power transmission device 10 detects the position of the power receiving device 20 and the distance from the power transmission device 10 using the two-dimensional sensor 161. The two-dimensional sensor 161 is described below. A pyroelectric sensor is known as a human sensor. In general, the pyroelectric sensor includes a single sensor element. The pyroelectric sensor including the single sensor element is capable of wide-range detection, however, it only detects whether a human exists in an area and is low in a position detection accuracy. Recently, an improved pyroelectric sensor with array sensors has been used. Such a pyroelectric sensor includes sensor elements arrayed in an N×N shape. The pyroelectric sensor including array sensors is capable of detecting a position in a wide area with high accuracy. For this reason, in the present exemplary embodiment, the pyroelectric sensor including array sensors is used as the two-dimensional sensor 161.

Figure 16:
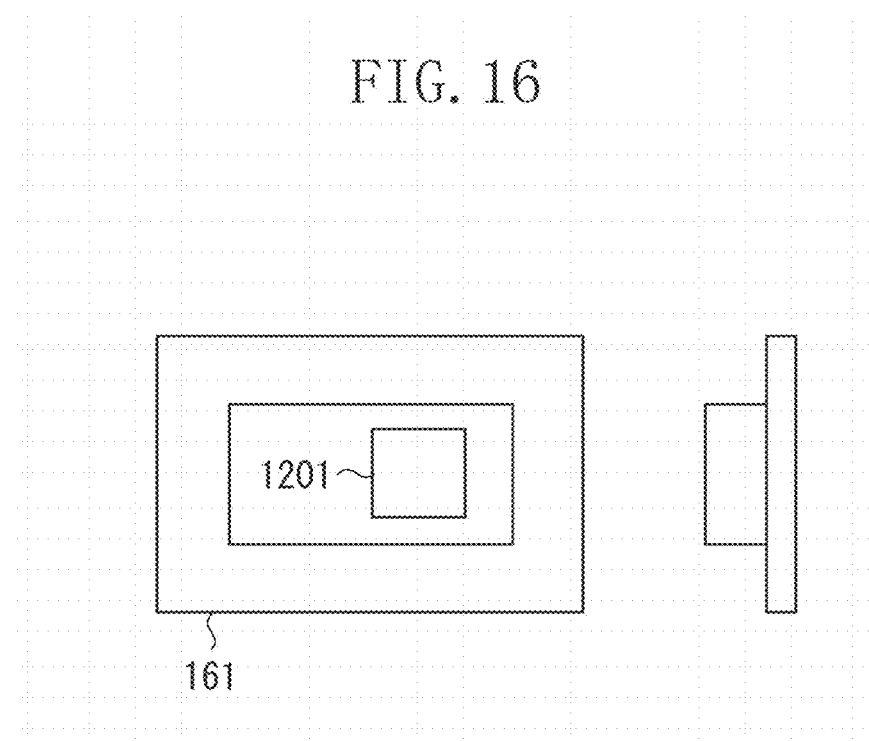
FIG. 16 illustrates an external form of a two-dimensional sensor.

FIG. 16 is a schematic diagram illustrating an example of an external form of the pyroelectric sensor used as the two-dimensional sensor 161. The pyroelectric sensor used as the two-dimensional sensor 161 includes a sensor lens 1201. The pyroelectric sensor detects the position of a human and the distance therefrom via the sensor lens 1201.

Figure 17:
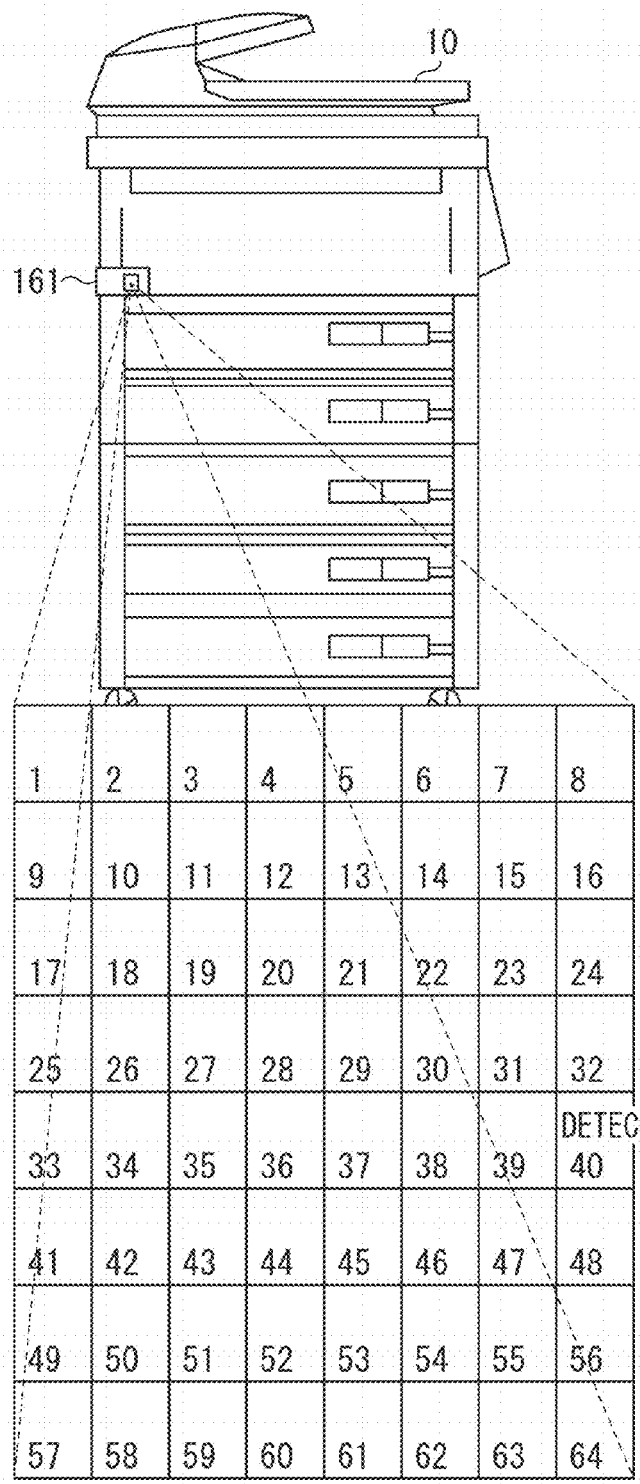
FIG. 17 schematically illustrates an example of a detection area of the two-dimensional sensor.

FIG. 17 illustrates an example of a configuration in which the two-dimensional sensor 161 is attached to the power transmission device 10. As illustrated in FIG. 17, the pyroelectric sensor used as the two-dimensional sensor 161 is provided at a predetermined position on the front surface of the power transmission device 10 (the side to which the user of the power receiving device 20 approaches). This is because the user of the power receiving device 20 approaches the front surface of the power transmission device 10, and because the detection area of the pyroelectric sensor is the downward area of an attachment position. That means, the two-dimensional sensor 161 has only to be attached to a position where the position of the user approaching the power transmission device 10 and the distance therefrom can be accurately detected in consideration of these characteristics. FIG. 17 illustrates an example of the pyroelectric sensor in which sensor elements are arranged in an 8×8 form. Such a pyroelectric sensor can detect where the user exists in a detection area divided in an 8×8 matrix form. The correspondence of the divided areas to the areas of the transmission efficiency is set in step S301. For example, the areas 1 to 24 correspond to an area with a transmission efficiency of 90% at a distance of zero to one meter. The areas 25 to 48 correspond to an area with a transmission efficiency of 40% at a distance of one to two meters. The areas 49 to 64 correspond to an area with a transmission efficiency of 10% at a distance of two meters or more. In this example, the detection area of the pyroelectric sensor used as the two-dimensional sensor 161 covers an area of about three square meters. FIG. 17 illustrates an example in which the user in an area 40 is detected.

Figure 18:
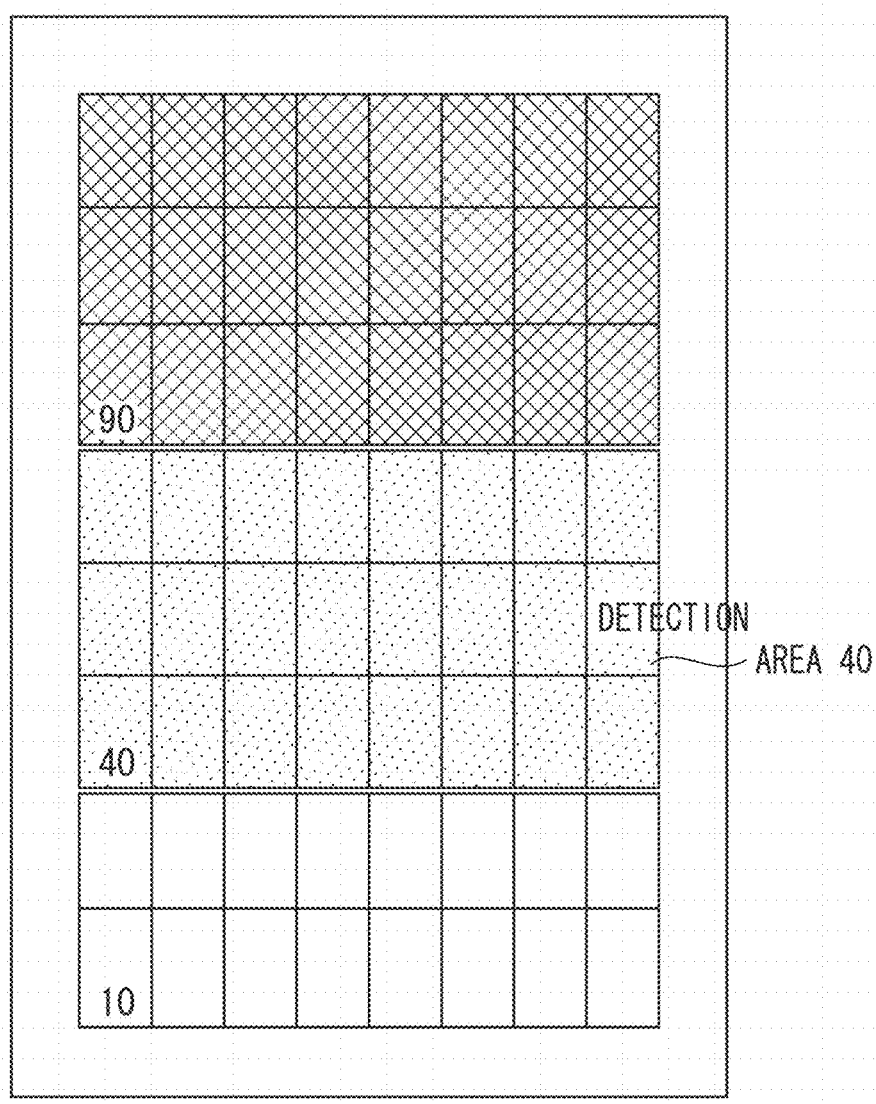
FIG. 18 illustrates the display of the relationship between the transmission efficiency and the distance onto which the detected position of the power receiving device is superimposed.

In step S404, the power transmission device 10 wirelessly transmits the position of the human (user) having the power receiving device 20 to the power receiving device 20. The power receiving device 20 displays the information about the received position of the user on the display device of the UI 215. FIG. 18 illustrates an example of display of information about the position of the user. For example, the power receiving device 20 displays the relationship between the transmission efficiency and the distance displayed in step S402 onto which the position of the user is superimposed. In the case of this example, "detection" is displayed in the position corresponding to the area 40. This allows the user to grasp his or her position and the distance from the power transmission device 10. Furthermore, the user can grasp the transmission efficiency in the position where the user lies. The display pattern is not limited to the pattern illustrated in FIG. 17. For example, "detection" is displayed here, however, the display is not limited to this "detection." In brief, any display pattern can be applied as long as the existence of the user in this area is displayed.

The user can determine whether he or she exists in a position high in transmission efficiency when viewing the display of the UI 215. In this example, the user can grasp that he or she exists in the position of the area 40 with a transmission efficiency of 40%. Thus, in the third exemplary embodiment, the wireless power supply system can urge the user of the power receiving device 20 to move to the position high in transmission efficiency.

Figure 19:
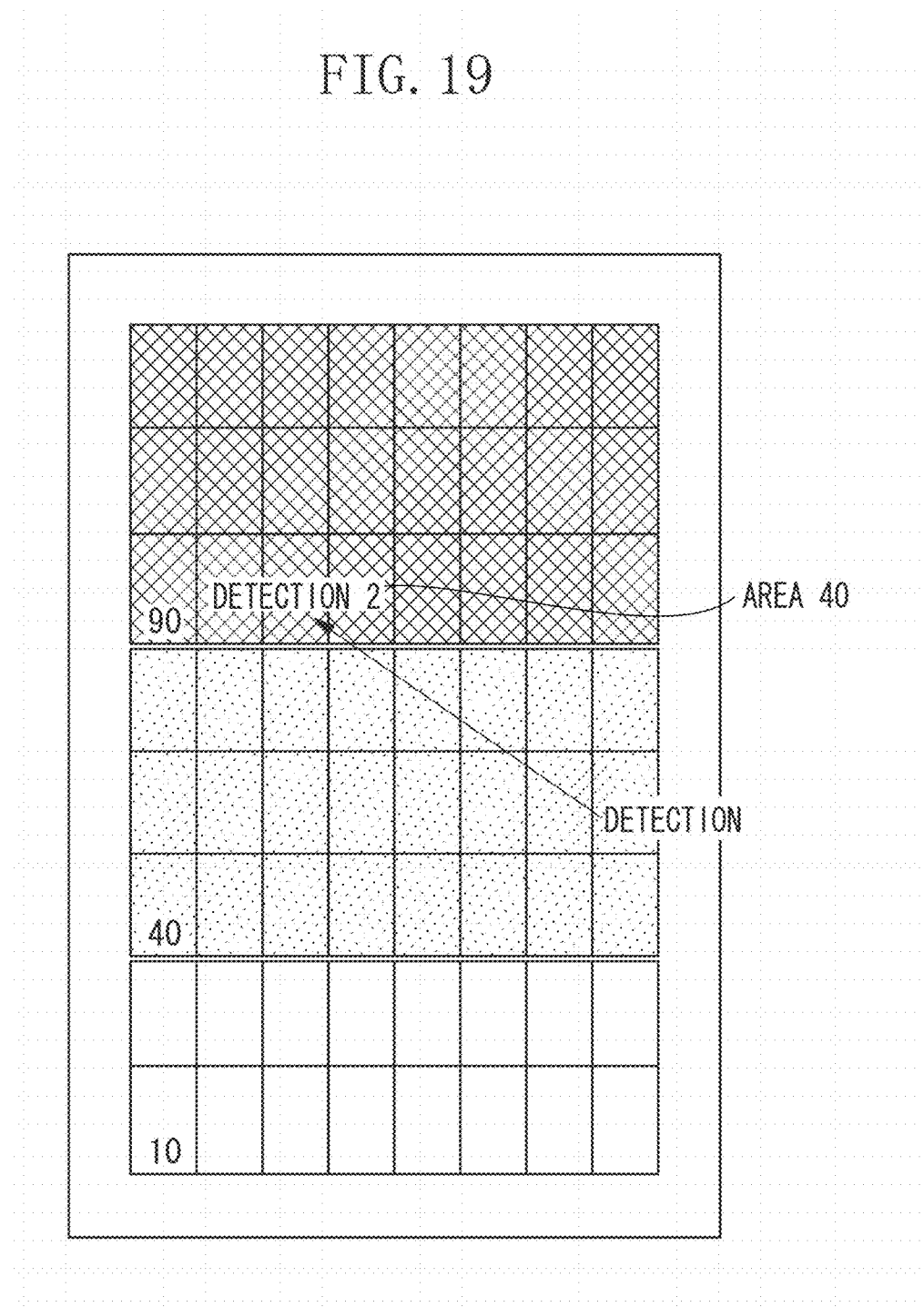
FIG. 19 is a chart illustrating an example in which the position of the power receiving device moves.

We suppose that the user of the power receiving device 20 views a mark indicating the current position in the display about the relationship between the transmission efficiency and the distance, and moves to the area high in transmission efficiency. In this case, the two-dimensional sensor 161 continuously detects the position of the moving user and continuously transmits information about the position to the power receiving device 20. The power receiving device 20 continuously receives the information about the position of the user from the power transmission device 10 and continuously displays the information on the UI 215. For example, we suppose that the two-dimensional sensor 161 detects that the user moves from the area 40 to an area 19. Then, as illustrated in FIG. 19, the power receiving device 20 receives information about the position of the user from the power transmission device 10 and displays on the UI 215 that the user moves from the area 40 to the area 19. Thereby, the user can determine that he or she moves to the area with a transmission efficiency of 90%.

According to such a configuration, it is possible to urge the user of the power receiving device 20 to move to the position high in transmission efficiency.

Timing of when the processing illustrated in FIG. 13 is executed is described below. FIG. 20 is a sequence diagram in which the processing of the control method described with reference to FIG. 13 is added to a sequence diagram illustrating the transmission and reception of data, and transmission of power between the power transmission device 10 and the power receiving device 20. As illustrated in FIG. 20, the power transmission device 10 and the power receiving device 20 requests an ID and transmits the ID in steps S201 and S202, respectively, and then execute the processing in steps S401 to S404. Thus, in the present exemplary embodiment, the user is previously urged to move to the position high in transmission efficiency. Thereafter, the power transmission device 10 transmits power in step S203.

A fourth exemplary embodiment of the present invention is described below. FIG. 21 is a sequence diagram illustrating the transmission and reception of data, and transmission of power between the power transmission device 10 and the power receiving device 20 in the fourth exemplary embodiment of the present invention.

The fourth exemplary embodiment is different from the third exemplary embodiment in that the sequence of "urging the user to move to the position high in transmission efficiency" (steps S401 to S404) is placed between "power transmission" (step S206) and "notification of power transmission completion" (step S207). Thus, in the fourth exemplary embodiment, the sequence of "urging the user to move to the position high in transmission efficiency" (steps S401 to S404) is carried out after power is transmitted (after steps S203 to S206). The user is allowed to move to the area high in transmission efficiency until power transmission is completed.

Configurations other than the above are common to those of the third exemplary embodiment, therefore, the description thereof is omitted.

As described above, according to the wireless power supply system in the exemplary embodiments of the present invention, the power transmission device notifies the power receiving device of the transmission efficiency of power. For this reason, the user can grasp which area has high power transmission efficiency by confirming the UI of the power receiving device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-014350 filed Jan. 29, 2013, which is hereby incorporated by reference herein in its entirety.

What is claimed is:

1. A power transmission device for wirelessly supplying power to a power receiving device located in a power supply area, the power transmission device comprising:
a first determining unit configured to determine whether a power receiving device exists in the power supply area;
a first transmitting unit configured to, in a case where the first determining unit determines that the power receiving device does not exist in the power supply area, transmit, to the power receiving device, a first notification prompting a user to move the power receiving device into the power supply area;
a second determining unit configured to determine, in a case where the first determining unit determines that the power receiving device exists in the power supply area, whether a second notification prompting a user to further move the power receiving device needs to be transmitted to the power receiving device; and
a second transmitting unit configured to transmit the second notification to the power receiving device in a case where the second determining unit determines that the second notification needs to be transmitted to the power receiving device,
wherein, in a case where the second determining unit determines that the second notification does not need to be transmitted to the power receiving device, the second transmitting unit does not transmit the second notification to the power receiving device.

2. A method for controlling a power transmission device for wirelessly supplying power to a power receiving device located in a power supply area, the method comprising:
determining first whether a power receiving device exists in the power supply area;
in a case where the first determining determines that the power receiving device does not exist in the power supply area, transmitting, to the power receiving device, a first notification prompting a user to move the power receiving device into the power supply area;
determining second, in a case where the first determining determines that the power receiving device exists in the power supply area, whether a second notification prompting a user to further move the power receiving device needs to be transmitted to the power receiving device; and
transmitting the second notification to the power receiving device in a case where the second determining determines that the second notification needs to be transmitted to the power receiving device,
wherein, in a case where the second determining determines that the second notification does not need to be transmitted to the power receiving device, the transmitting does not transmit the second notification to the power receiving device.

3. A computer-readable storage medium storing a program that causes a computer to perform a process for a power transmission device for wirelessly supplying power to a power receiving device located in a power supply area, the process comprising:
determining first whether a power receiving device exists in the power supply area;
in a case where the first determining determines that the power receiving device does not exist in the power supply area, transmitting, to the power receiving device, a first notification prompting a user to move the power receiving device into the power supply area;
determining second, in a case where the first determining determines that the power receiving device exists in the power supply area, whether a second notification prompting a user to further move the power receiving device needs to be transmitted to the power receiving device; and
transmitting the second notification to the power receiving device in a case where the second determining determines that the second notification needs to be transmitted to the power receiving device,
wherein, in a case where the second determining determines that the second notification does not need to be transmitted to the power receiving device, the transmitting does not transmit the second notification to the power receiving device.

4. The power transmission device according to claim 1, further comprising an identification unit configured to identify a distance between the power transmission device and the power receiving device,
wherein, based on the identified distance, the second determining unit determines whether the second notification needs to be transmitted to the power receiving device.

5. The power transmission device according to claim 4, wherein the power supply area is divided into a plurality of areas,
wherein, in a case where the identified distance indicates that the power receiving device exists outside of an area having the highest transmission efficiency, among the plurality of areas, the second determining unit determines that the second notification needs to be transmitted to the power receiving device, and
wherein, in a case where the identified distance indicates that the power receiving device exists in the area having the highest transmission efficiency, the second determining unit determines that the second notification does not need to be transmitted to the power receiving device.

6. The power transmission device according to claim 5, wherein the first notification includes information about at least a distance from the power receiving device to the power supply area, and
wherein the second notification includes information about at least a distance from the power receiving device to the area having the highest transmission efficiency.

7. The power transmission device according to claim 1, wherein the power supply area is divided into a plurality of areas,
wherein, in a case where the power receiving device exists outside of an area having the highest transmission efficiency, among the plurality of areas, the second determining unit determines that the second notification needs to be transmitted to the power receiving device, and
wherein, in a case where the power receiving device exists in the area having the highest transmission efficiency, the second determining unit determines that the second notification does not need to be transmitted to the power receiving device.

8. The power transmission device according to claim 7,
wherein the first notification includes information about at least a distance from the power receiving device to the power supply area, and
wherein the second notification includes information about at least a distance from the power receiving device to the area having the highest transmission efficiency.

* * * * *